United States Patent
Kato et al.

(10) Patent No.: US 7,360,106 B2
(45) Date of Patent: Apr. 15, 2008

(54) POWER-SAVING PROCESSING UNIT, POWER-SAVING PROCESSING METHOD AND PROGRAM RECORD MEDIUM

(75) Inventors: Kazuomi Kato, Otsu (JP); Tetsuji Yamamoto, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 418 days.

(21) Appl. No.: 11/196,735

(22) Filed: Aug. 4, 2005

(65) Prior Publication Data
US 2006/0031692 A1    Feb. 9, 2006

(30) Foreign Application Priority Data
Aug. 5, 2004    (JP)    .............................. 2004-229216

(51) Int. Cl.
*G06F 1/32*    (2006.01)
(52) U.S. Cl. ..................... 713/323; 713/300; 713/320
(58) Field of Classification Search ................ 713/300, 713/323
See application file for complete search history.

(56) References Cited

U.S. PATENT DOCUMENTS

| 5,560,023 | A | * | 9/1996 | Crump et al. ................ 713/323 |
| 6,237,102 | B1 | * | 5/2001 | Lee ............................. 713/323 |
| 6,289,399 | B1 | | 9/2001 | Furuichi et al. |
| 6,748,546 | B1 | * | 6/2004 | Mirov et al. ................ 713/320 |
| 7,137,117 | B2 | * | 11/2006 | Ginsberg ..................... 718/102 |

FOREIGN PATENT DOCUMENTS

JP    11-73255    3/1999

* cited by examiner

*Primary Examiner*—Nitin C. Patel
(74) *Attorney, Agent, or Firm*—Wenderoth, Lind & Ponack, L.L.P.

(57) ABSTRACT

A power-saving processing unit is provided which is capable of realizing proper mode switching by taking into account a power consumption as well in a shift processing and a return processing for switching an operation mode. In a power-consumption information table 170, there are recorded a power consumption (mJ) which is required for a processing for shifting into a power-saving mode, a consumed power (mW) when an operation is executed in the power-saving mode and a power consumption (mJ) which is required for a processing for returning to an ordinary mode. A time prediction section 102 refers to a timer-list management queue 201 and predicts a period of time until the power-saving mode is removed. On the basis of the power-consumption information table 170 and the predicted time, a mode-switching decision section 103 compares a power consumption (mJ) when switching is executed into the power-saving mode and a power consumption (mJ) when the switching is not executed, and only if the former is far less than the latter, decides that switching should be executed into the power-saving mode.

19 Claims, 15 Drawing Sheets

FIG.3

| IDENTIFICATION NUMBER | OPERATION MODE | CPU CLOCK | INTERNAL MEMORY | EXTERNAL MEMORY | NETWORK IF | LCD BRIGHTNESS |
|---|---|---|---|---|---|---|
| 0 | ORDINARY MODE | HIGH | ON | ON | ON | HIGH |
| 1 | MAKE AN EXTERNAL MEMORY SLEEP | HIGH | ON | OFF | ON | HIGH |
| 2 | MAKE AN INTERNAL MEMORY AND AN EXTERNAL MEMORY SLEEP | LOW | OFF | OFF | ON | LOW |
| 3 | MAKE A CPU, AN INTERNAL MEMORY, AN EXTERNAL MEMORY AND A PERIPHERAL DEVICE SLEEP | OFF | OFF | OFF | ON | OFF |
| 4 | TURN OFF A NETWORK INTERFACE | HIGH | ON | ON | OFF | HIGH |
| 5 | LOWER THE BRIGHTNESS OF AN LCD | HIGH | ON | ON | ON | LOW |
| ⋮ | ⋮ | ⋮ | ⋮ | ⋮ | ⋮ | ⋮ |

151 152 153

150 : POWER-SAVING MODE TABLE

FIG.4

| 151 | 152 | 171 | 172 | 173 |
|---|---|---|---|---|
| IDENTIFICATION NUMBER | OPERATION MODE | POWER CONSUMPTION WHEN SWITCHING INTO POWER-SAVING MODE | POWER CONSUMPTION WHEN RETURNING FROM POWER-SAVING MODE | CONSUMED POWER IN EACH MODE |
| 0 | ORDINARY MODE | | | 500mW |
| 1 | MAKE AN EXTERNAL MEMORY SLEEP | 200mW × 1msec | 200mW × 1msec | 300mW |
| 2 | MAKE AN INTERNAL MEMORY AND AN EXTERNAL MEMORY SLEEP | 200mW × 2msec | 200mW × 2msec | 70mW |
| 3 | MAKE A CPU, AN INTERNAL MEMORY, AN EXTERNAL MEMORY AND A PERIPHERAL DEVICE SLEEP | 300mW × 10msec | 300mW × 15msec | 10mW |
| 4 | TURN OFF A NETWORK INTERFACE | 200mW × 0.2msec | 200mW × 0.3msec | 400mW |
| 5 | LOWER THE BRIGHTNESS OF AN LCD | 200mW × 0.5msec | 200mW × 0.5msec | 100mW |
| ⋮ | ⋮ | ⋮ | ⋮ | ⋮ |

170: POWER-CONSUMPTION INFORMATION TABLE

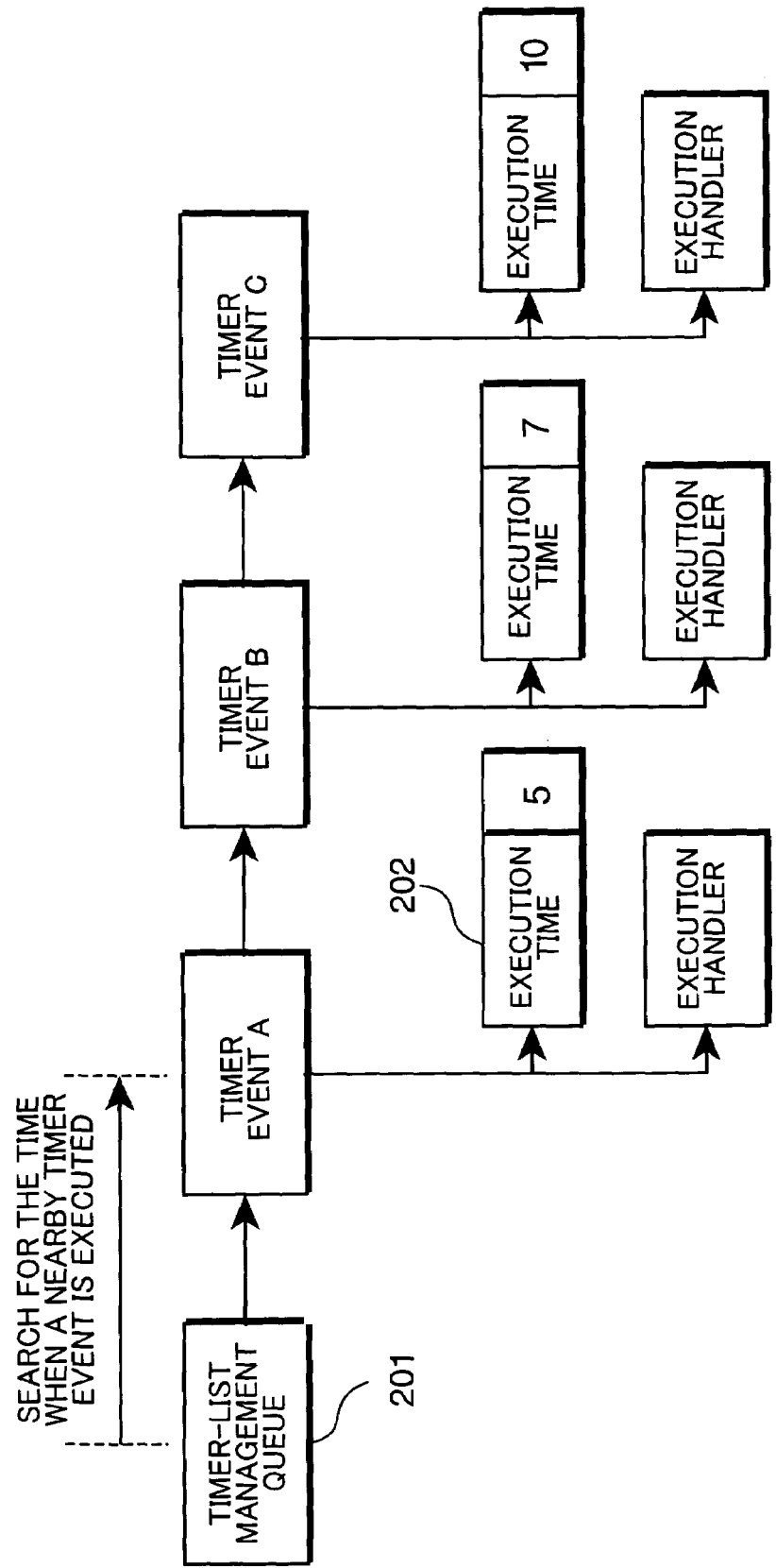

FIG.6

| INTERRUPTION CONTENT | STATE, VALID OR INVALID | SHORTLY-BEFORE ISSUANCE TIME INTERVAL (msec) | AVERAGE ISSUANCE TIME INTERVAL (msec) | AVERAGE NUMBER OF TIMES | SHORTLY-BEFORE INTERRUPTION TIME |
|---|---|---|---|---|---|
| TIMER INTERRUPTION | INVALID | 100 | 70 | 10 | 110 |
| PERIODIC INTERRUPTION FROM ANOTHER CPU | VALID | 500 | 400 | 10 | 51 |
| PERIODIC INTERRUPTION FROM A NETWORK DEVICE | VALID | 1000 | 1200 | 10 | 15 |
| ... | | ... | | | |

221 / 222 / 223 / 224 / 225 / 226

220 : INTERRUPTION RECORD TABLE

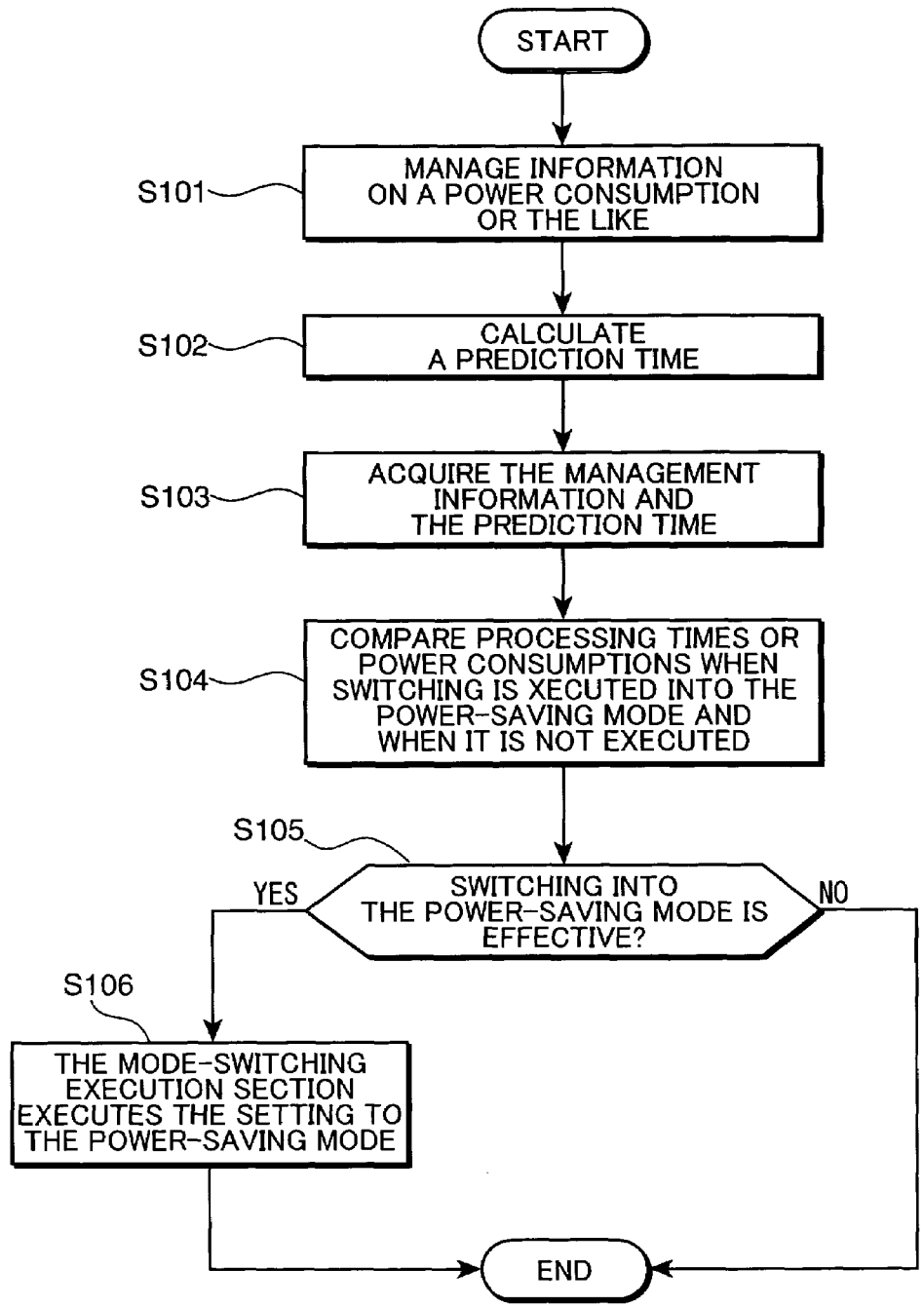

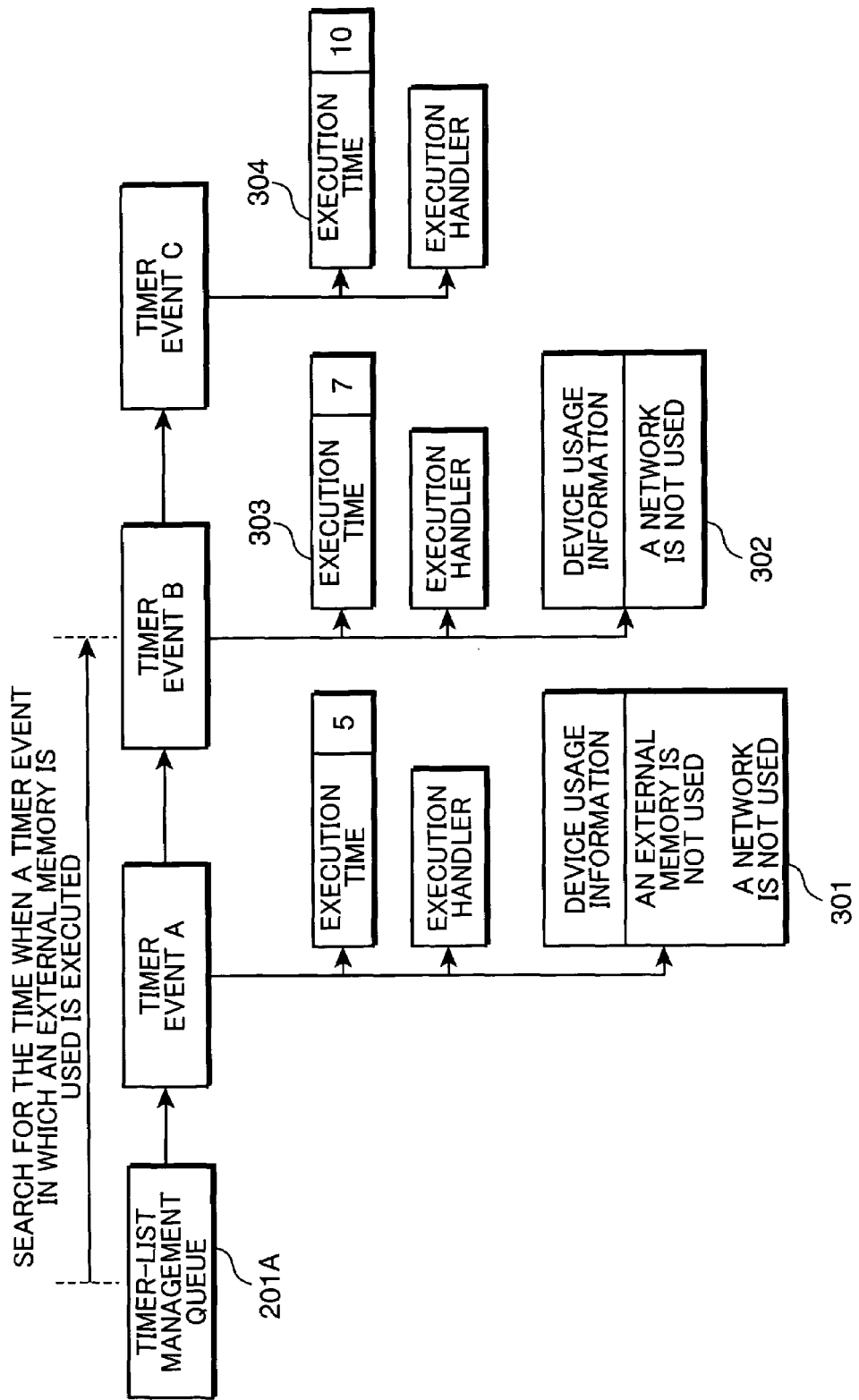

FIG.10

| INTERRUPTION CONTENT | STATE, VALID OR INVALID | SHORTLY-BEFORE ISSUANCE TIME INTERVAL (msec) | AVERAGE ISSUANCE TIME INTERVAL (msec) | AVERAGE NUMBER OF TIMES | SHORTLY-BEFORE INTERRUPTION TIME | DEVICE USAGE INFORMATION |
|---|---|---|---|---|---|---|
| TIMER INTERRUPTION | INVALID | 100 | 70 | 10 | 110 | A NETWORK IS NOT USED AN EXTERNAL MEMORY IS NOT USED |
| PERIODIC INTERRUPTION FROM ANOTHER CPU | VALID | 500 | 400 | 10 | 51 | A NETWORK IS NOT USED |
| PERIODIC INTERRUPTION FROM A NETWORK DEVICE | VALID | 1000 | 1200 | 10 | 15 | (NONE) |
| ... | | | | | ... | |

221  222  223  224  225  226  355

220A : INTERRUPTION RECORD TABLE

FIG.11

| MODE | 0 | | | 1 | | | 2 | | | ... |
|------|---|---|---|---|---|---|---|---|---|---|
| DATA | 171 | 172 | 173 | 171A | 172A | 173A | 171B | 172B | 173B | |
| 0 | | | 500mW | | | 500mW | | | | ... |
| 1 | 200mW × 1msec | 200mW × 1msec | 300mW | — | — | — | ... | ... | ... | ... |
| 2 | 200mW × 2msec | 200mW × 2msec | 70mW | 150mW × 1.5msec | 150mW × 1.5msec | 70mW | ... | — | ... | ... |
| 3 | 300mW × 10msec | 300mW × 15msec | 10mW | 200mW × 7msec | 200mW × 1msec | 10mW | — | — | — | ... |
| 4 | 200mW × 0.2msec | 200mW × 0.3msec | 400mW | 150mW × 0.15msec | 150mW × 0.2msec | 400mW | ... | ... | ... | ... |
| 5 | 200mW × 0.5msec | 200mW × 0.5msec | 100mW | 150mW × 0.3msec | 150mW × 0.3msec | 100mW | ... | ... | ... | ... |
| ... | ... | ... | ... | ... | ... | ... | ... | ... | ... | ... |

170A : POWER-CONSUMPTION INFORMATION TABLE

POWER-SAVING PROCESSING UNIT, POWER-SAVING PROCESSING METHOD AND PROGRAM RECORD MEDIUM

CROSS-REFERENCE TO RELATED APPLICATIONS

This application is based on Japanese patent application serial No. 2004-229216, filed in Japan Patent Office on Aug. 5, 2004, the contents of which are hereby incorporated by reference.

BACKGROUND OF THE INVENTION

1. Field of the Invention

The present invention relates to a power-saving processing technique, particularly an improvement for enhancing an electricity-conservation effect.

2. Description of the Related Art

There has been known an art of keeping down a power consumption of electrical equipment. In such an art, a power consumption is restrained by reducing the frequency of a clock which is supplied to a CPU, a memory, each device or the like that configures electrical equipment, or lowering a voltage which is supplied to these. Besides, a technique of decreasing a power consumption has also been known by keeping under control a power which is supplied to them, or stopping a power supply. Such a power-consumption restraint processing is executed when a targeted apparatus element (e.g., a CPU, a memory and each device) is not used now. Or, when it can be operated with a weak power even in use (e.g., when a program which is processed in a CPU is kept idle). In addition, there has been known another art of keeping a power consumption at a proper level (e.g., refer to Japanese Patent Laid-Open No. 11-73255 specification). In that art, several power-saving modes are set which include even the power control of a peripheral device. Then, the usage situations of an execution application and the peripheral device are monitored, and a power-saving mode is chosen which can be adopted according to those usage situations.

However, in order to reduce a clock frequency, lower a voltage or bring a power supply to a halt, a fixed processing has to be executed based on the specification of an objective apparatus element. Besides, when a power supply is stopped, a certain period can be required so that an operation becomes stable. In short, a predetermined processing is necessary for keeping a power consumption lower, thus generating additional power consumption. This power consumption depends upon an apparatus element which undergoes such a power-saving processing. If a power-saving processing is given to many apparatuses, their power consumption is greater than in the case where a small number of apparatus elements are subjected to a power-saving processing. On the other hand, a power consumption during a period of time when an operation is executed in a power-saving mode is generally smaller when a lot of apparatus elements undergo a power-saving processing.

In the above described prior art, no consideration is given to such a power consumption which is spent when a power-saving processing is given to each apparatus element. As a result, the prior art has the following disadvantages. Even if switching is executed into a power-saving mode so that a power consumption can be restrained, the power consumption may be greater against the intention. Or, if a processing quantity is increased despite little change in a power consumption, the performance of equipment may get worse, such as a delay in its response.

For example, if a request to operate in an ordinary mode is made while electrical equipment is switching its own operation mode into a power-saving mode, its mode may be immediately returned to the ordinary mode. Besides, if electrical equipment returns into an ordinary mode a short period of time after it shifts into a power-saving mode, it does not operate long enough in the power-saving mode. This causes a power-saving processing to accounts for a large proportion of the operation. In this case, switching into the power-saving mode may contribute to an increase in the power consumption, contrary to the purpose.

DISCLOSURE OF THE INVENTION

In view of the above described disadvantages, it is an object of the present invention to provide a power-saving processing unit, a power-saving processing method and a program record medium which are capable of realizing proper mode switching by taking into account a power consumption as well in a shift processing and a return processing for switching an operation mode.

In order to resolve the above described disadvantage and attain this object, one aspect of the present invention is directed to a power-saving processing unit which switches an operation mode of an object apparatus between a plurality of modes that includes an ordinary mode and one or more power-saving modes. The unit comprises: a power-consumption information management section which manages information on a processing for switching the operation mode; a time prediction section which, when a request is made to switch from a current mode to another mode among the plurality of modes, then predicts a period of time until such another mode is removed if the switching request is accepted or a period of time until a return is given to the current mode if the switching request is accepted; a mode-switching decision section which calculates a period of time when such another mode continues based on management information which is the information that is managed by the power-consumption information management section and prediction time which is the period of time that is predicted by the time prediction section, and using the calculated value, decides whether or not the operation mode should be switched from the current mode to such another mode; and a mode-switching execution section which switches the operation mode of the object apparatus according to a decision by the mode-switching decision section.

The management information includes information for deriving a period of time when each of the other modes continues based upon the prediction time for each mode, from among a processing time which is taken for a shift processing from the current mode to each of the other modes and a processing time which is taken for a return processing from each of the other modes to the current mode.

As described so far, the power-saving processing unit, the power-saving processing method and the program record medium according to the present invention, proper mode switching can be realized, considering a power consumption as well which is produced in a shift processing and a return processing for switching an operation mode.

These and other objects, features and advantages of the present invention will become more apparent upon reading of the following detailed description along with the accompanied drawings.

BRIEF DESCRIPTION OF THE DRAWINGS

FIG. 3 is a table, showing an example of a power-saving mode table of FIG. 1.

FIG. 4 is a table, showing an example of a power-consumption information table of FIG. 1.

FIG. 5 is a representation, illustrating a form in which a timer-list management queue of FIG. 1 manages a timer event.

FIG. 6 is a table, showing an example of an interruption record table of FIG. 1.

FIG. 8 is a flow chart, showing an operation procedure of a power-saving processing unit in FIG. 1.

FIG. 9 is a representation, illustrating a form in which a timer-list management queue according to a second embodiment of the present invention manages a timer event.

FIG. 10 is a table, illustrating an interruption record table according to the second embodiment of the present invention.

FIG. 11 is a table, showing an example of a power-consumption information table according to a third embodiment of the present invention.

DETAILED DESCRIPTION OF INVENTION

Hereinafter, embodiments of the present invention will be described with reference to the drawings.

First Embodiment

Figure 1:
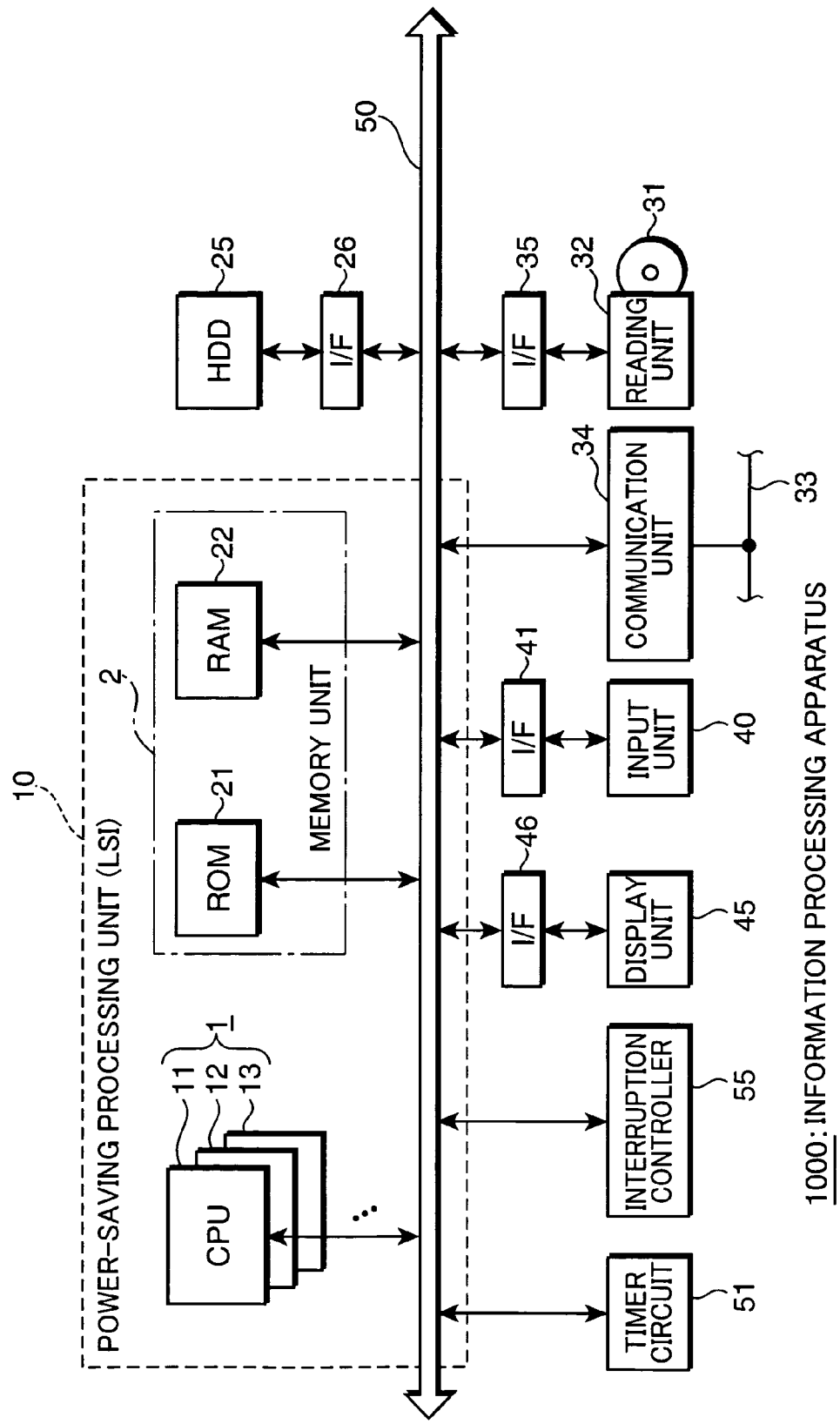
FIG. 1 is a block diagram, showing the configuration of an information processing apparatus according to a first embodiment of the present invention.

FIG. 1 is a block diagram, showing the configuration of an information processing apparatus according to a first embodiment of the present invention. Such an information processing apparatus 1000 itself can be used by a user, but it may also be incorporated into various types of electrical equipment. An example of the information processing apparatus 1000 is a portable communication terminal such as a PDA (or personal digital assistance) or a mobile phone. In a portable communication terminal, a small battery is used as a power source. Thus, it can receive an extreme benefit from a power-saving processing unit (described later) which has an improved power-saving effect.

The information processing apparatus 1000 includes: a CPU (or central processing unit) 1; a memory unit 2; a communication unit 34; an input unit 40; a display unit 45; a timer circuit 51; and an interruption controller 55. These units are connected to each other via a bus line 50. Besides, if necessary, a hard-disk unit 25 and a reading unit 32 can be connected to the bus line 50. The hard-disk unit 25, the reading unit 32, the input unit 40 and the display unit 45 are connected to the bus line 50, through interfaces 26, 35, 41 and 46, respectively.

The CPU 1 may also be formed by a single CPU, or it may also be made up of a plurality of CPUs. As an example, the information processing apparatus 1000 includes several CPUs 11, 12, 13, . . . The memory unit 2 is provided with an ROM (or read only memory) 21 and an RAM (or random access memory) 22. In the ROM 21, a computer program is stored which governs an operation of the CPU 1. Such a computer program can be stored in the hard-disk unit 25. The CPU 1 writes the computer program which is stored in the ROM 21 or the hard-disk unit 25, if necessary, in the RAM 22. Simultaneously, it executes a processing which is prescribed by the computer program. The RAM 22 also works as a medium which temporarily stores data that is generated as the CPU 1 executes a processing.

The hard-disk unit 25 is a unit which writes and reads the computer program or data in and from a built-in hard disk (not shown). The reading unit 32 is a unit which reads a computer program or data that is recorded in a CD-ROM 31. The communication unit 34 is a unit which exchanges a computer program or data between the outside and itself, through a telecommunication line 33 such as a telephone line. The input unit 40 is a unit which inputs data or the like by a user's manipulation. For example, it is a keyboard which is disposed in a PDA, an input button which is placed in a cell phone, or a mouse and a keyboard which can be freely attached and detached. The display unit 45 is a unit which displays data, an image or the like on a screen, or displays data or the like with a voice. For example, it is an LCD (or liquid crystal display).

The timer circuit 51 is a unit which outputs a timer interruption signal in a fixed cycle. The interruption controller 55 is a unit which relays, to the CPU 1, an interruption request signal that is sent from the timer circuit 51, the input unit 40, a CPU except the CPU where a processing is in execution in the CPU 1, the communication unit 34 as a network device, the hard-disk unit 25, the reading unit 32, or the like. Priority is given to an interruption request from each unit. The interruption controller 55 has the function of, when several units each issue an interruption at the same time, mediating between those requests according to their priority.

As described above, the information processing apparatus 1000 is configured as a computer. The above described computer program can also be provided via a program record medium, such as the ROM 21, a flexible disk (not shown) and the CD-ROM 31. It can also be provided through a transmission medium such as the telecommunication line 33. For example, a computer program which is recorded in the CD-ROM 31 as the program record medium can be read by connecting the reading unit 32 to the information processing apparatus 1000. Besides, it can be stored in the RAM 22 or the hard-disk unit 25.

In the case where a computer program is provided by the ROM 21 as the program record medium, the ROM 21 is mounted in the information processing apparatus 1000. Thereby, the CPU 1 can execute a processing according to this computer program. A computer program which is provided through the transmission medium such as the telecommunication line 33 is received via the communication unit 34. Then, it is stored, for example, in the RAM 22 or the hard-disk unit 25. The transmission medium is not limited to a wired transmission medium and may also be a wireless transmission medium. In addition, the transmission medium includes not only a communication line, but also a relay unit which relays a communication line, for example, a router.

A power-saving processing unit 10 which includes the CPU 1 and the memory unit 2 that stores a power-saving processing program and which itself is configured as a computer, is incorporated into the information processing apparatus 1000. Thereby, it switches the operation mode of the information processing apparatus 1000 from an ordinary mode to a power-saving mode, and vice versa. The power-saving processing unit 10 switches an operation mode, preferably, including itself, between an ordinary mode and a power-saving mode. The power-saving processing unit 10 is configured, more desirably, as an integrated circuit, such as an LSI (or large-scale integrated circuit), which is formed by embedding the CPU 1 and the memory unit 2 in a single semiconductor substrate.

Figure 2:
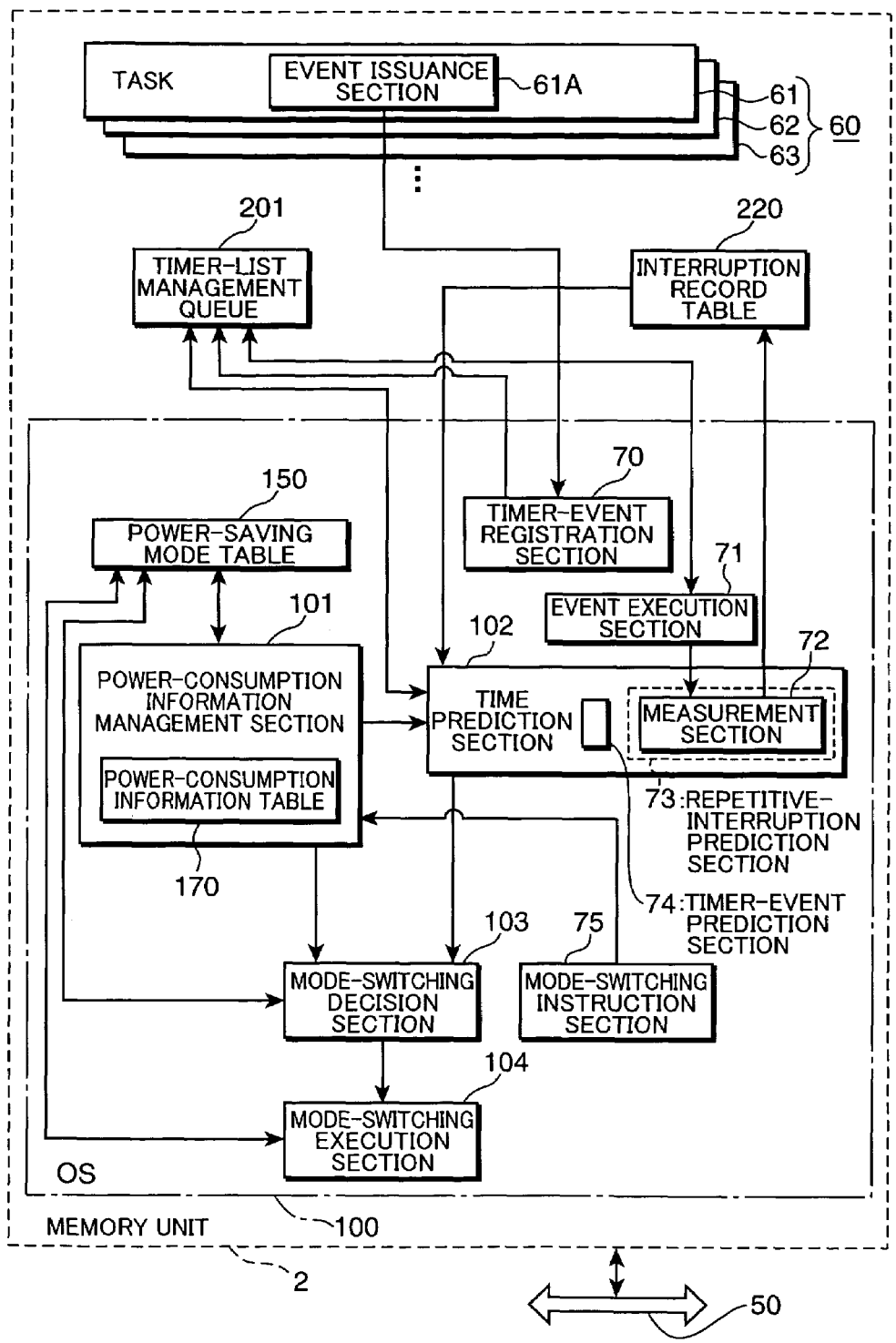
FIG. 2 is a block diagram, showing the configuration of a program which is stored in a memory unit of FIG. 1.

FIG. 2 is a block diagram, showing the configuration of a program which is stored in the memory unit 2 of the power-saving processing unit 10. In the memory unit 2, there are stored a program or data which includes one or more tasks 60 and an operating system (or OS) 100 for a computing apparatus. Individual tasks 61, 62, 63 and the like which are included in the task 60 may be an application. They may also be middleware such as a file system and a browser and may also be a part of the OS 100 such as a device driver. In FIG. 1, as an example, the task 60 is shown as a program except the OS 100.

Each task 61, 62, 63 or the like which is included in the task 60 has priority, similarly to a task which is managed in an ordinary multi-tasking computing apparatus. Thereby, they are processed in order of their priority. If an event such as an interruption is issued, a handler which is provided in the OS 100 is given priority over a task and is executed. The "execution of an event" means the execution of a handler with the event's issue as a trigger, and a succeeding execution such as a system call which is provided in the OS 100, and the like. Along with this, if a change is made in the task priority, a task scheduler which is included in the OS 100 executes the task 60 based on the changed priority. The OS 100 may also be held in either the ROM 21 or the RAM 22.

The OS 100 realizes the power-saving processing unit 10 in collaboration with the CPU 1. For this purpose, it includes as its main elements: a mode-switching instruction section 75; a power-consumption information management section 101; a time prediction section 102; a mode-switching decision section 103; and a mode-switching execution section 104. The mode-switching instruction section 75 transmits a request to switch from an ordinary mode to a power-saving mode to the power-consumption information management section 101. The mode-switching instruction section 75 sends the switching request with the following case as a trigger: when the CPU 1 halts its execution a certain period of time; when a battery capacity lowers; when a user's input operation for the input unit 40 is stopped over a fixed period of time; when a given period passes in a static state where a waiting image is displayed in the display unit 45; when a user gives an instruction to shift into a power-saving mode by operating the input unit 40; or the like.

The power-saving mode does not need to be a single type, and several types may also be prepared. According to this embodiment, a plurality of levels which each has a different power-saving effect are prepared as the power-saving mode. If the power-saving mode are provided with several kinds, the mode-switching instruction section 75 designates a power-saving mode at a shift destination and gives an instruction to shift into the power-saving mode. Herein, shortly before the operation mode shifts into a power-saving mode, the CPU 1's operation is not necessarily halted. The CPU 1 may also be executing a processing for the task 60. For example, even when a waiting image is displayed in a static state in the display unit 45, the CPU 1 is executing a task for displaying an image.

The power-consumption information management section 101 manages information (hereinafter, referred to as the "management information") on a processing for switching the operation mode. A power-saving mode table 150 and a power-consumption information table 170 shown in FIG. 2 each correspond to a specific example of the management information.

FIG. 3 is a table, showing an example of the power-saving mode table 150. In the power-saving mode table 150, an identification number 151, an operation mode 152 and an apparatus choice information 153 are recorded so as to relate to each other. The identification number 151 is information for identifying each operation mode, in other words, a form of identification information. Instead of the identification number 151, another identification code may also be used. In general, some identification information may also be used. If each power-saving mode can be identified without any identification information, there is no need for identification information.

The operation mode 152 indicates the contents of a processing for each operation mode. These contents are determined by the apparatus choice information 153 which indicates a combination of each processing for apparatus elements of the information processing apparatus 1000. The power-saving mode table 150 serves as long as such a processing for each apparatus element as illustrated in the apparatus choice information 153 can be managed. For example, the power-saving mode table 150 may also be made up of only the identification number 151 and the apparatus choice information 153. Or, another piece of information may also be added to them.

If the identification number 151 is "0", the operation mode is an ordinary mode. If it is "1", "2" . . . , the operation mode is several kinds of power-saving modes. In the ordinary mode "0", each apparatus element is processed so that their performance is brought to the full. In terms of the ordinary mode "0", the contents of a processing for each apparatus element are obvious in the OS 100. Hence, in particular, there is no need to record them in the power-saving mode table 150.

The power-saving mode "1" is a power-saving mode in which only an external memory sleeps. In this mode: the CPU 1's clock frequency is high; an internal memory ordinarily operates (ON); the external memory is in a standby mode (OFF); a power source is ordinarily supplied to the communication unit 34 or a network interface (ON); and the brightness of an LCD which is an example of the display unit 45 is set to a high level as usual.

In addition to the elements which are illustrated in the apparatus choice information 153, other various apparatus elements to which a power-saving processing is applicable can be an object for the power-saving processing. For example, various arithmetic processing units may be a target for the power-saving processing. It is possible to make the operation and stop of the CPU 1, or the operation and halt of each type of processor such as a DSP, an object for the power-saving processing. Besides, various storage units may also be a target for the power-saving processing. For example, the following devices can be an object for the power-saving processing: a volatile memory (an example of which is the RAM 22) such as a DRAM and an SRAM; a non-volatile memory (an example of which is the ROM 21)

such as a flash ROM; a memory card, hard disk or floppy (which is a registered trademark) disk drive; the reading unit 32 as a CD drive; a DVD drive; or the like. In addition, it is possible to set various input units 40 or interfaces which correspond to equipment, to an object for the power-saving processing. For example, the following devices can also be an object for the power-saving processing: an antenna, a key or a mouse; or a serial or parallel interface, such as a USB, an IEEE1394 and a PCMCIA. Furthermore, the display unit 45 such as an LCD and a CRT, a lighting unit or the like may also be a target for the power-saving processing. Moreover, the contents of a power-saving processing are not limited to a rise or a fall in the clock frequency of each apparatus element, whether a standby mode is turned On or OFF, or whether a power source is turned On or OFF. As illustrated in a rise or a fall in the brightness of an LCD, the contents of a power-saving processing differ as to a power-saving processing which can be applied by each apparatus element as an object for a processing. It is also possible to set a unique power-saving processing for an apparatus element which is a processing object.

Herein, according to this embodiment, a plurality of power-saving modes are set, but as described already, a single power-saving mode may also be set. Besides, an apparatus element which is a power-saving object may also be single. For example, only the mode of making an external memory sleep which corresponds to the identification number "1" of FIG. 3 may also be managed as a power-saving mode. In that case, as a power-saving processing which is applied to each apparatus element, only the fact that the external memory is brought into a standby mode (i.e., it is turned OFF) by making a comparison with an ordinary mode may also be managed.

FIG. 4 is a table, showing an example of the power-consumption information table 170. In the power-consumption information table 170, to an identification number 151 and an operation mode 152 which is information that is common as a key to the power-saving mode table 150, two kinds of power consumptions 171, 172 and a consumed power 173 are recorded so as to relate each other. The power consumption 171 is a power consumption (mJ) which is spent in the information processing apparatus 1000 as a processing is executed for shifting from an ordinary mode to each power-saving mode. The power consumption 172 is a power consumption (mJ) which is spent in the information processing apparatus 1000 as a processing is executed for returning from each power-saving mode to the ordinary mode.

In further detail, the power consumption 171 includes a consumed power (W) and a processing time (msec) which are required in the shift processing. The power consumption 172 includes a consumed power (W) and a processing time (msec) which are required in the return processing. As the power consumptions 171, 172, a consumed power (W) and a processing time (msec) are recorded, but instead, a power consumption (mJ) and a processing time (msec) may also be recorded. The power consumptions 171 and 172 (mJ) are each an overhead power consumption which is spent by using a power-saving mode. The consumed power 173 is a consumed power (mW) in each operation mode.

If a description is given using an example, the power-saving mode of the identification number "2" is a power-saving mode in which a sleep is given to an internal memory and an external memory. In this mode, the power consumption which is required in a shift processing for switching from an ordinary mode to a power-saving mode is 200 mW×2 msec (=400 mJ). This information indicates that a consumed power in the shift processing is 200 mW and the shift processing takes a processing time of 2 msec. The power consumption which is required in a processing for returning from the power-saving mode to the ordinary mode is the same 200 mW×2 msec. When the information processing apparatus 1000 is in operation in the power-saving mode "2" where a sleep is given to an internal memory (e.g., the memory unit 2) and an external memory (e.g., the hard-disk unit 25), the consumed power is 70 mW.

Each power-saving mode is set when a system such as the information processing apparatus 1000 is developed, or at another such time. An apparatus element that is an object to which a power-saving processing is applied, or the contents of a power-saving processing which is applied to the apparatus element can also be preset. According to these setting contents, the contents which are recorded in each table of FIG. 3 and FIG. 4 can be recorded in a manufacturing process of the information processing apparatus 1000 or the like. For example, an actual measurement value or a theoretical value can be recorded as the power consumptions 171, 172 and the consumed power 173.

Returning to FIG. 2, when a mode-switching request is transmitted from the mode-switching instruction section 75 to the power-consumption information management section 101, the power-consumption information management section 101 sends the mode-switching request to the time prediction section 102. Or, a mode-switching request may also be transmitted from the mode-switching instruction section 75 to both the power-consumption information management section 101 and the time prediction section 102. The former example is shown in FIG. 2.

When a request is transferred to switch from an ordinary mode to a power-saving mode, if a shift is provisionally executed into the power-saving mode, the time prediction section 102 predicts a period of time until the power-saving mode at the shift destination is lifted. The period of time (hereinafter, referred to as the "prediction time") which is predicted by the time prediction section 102 is a period of time (i.e., Tu+Ts of FIG. 7 described later) from the time when a switching request is transmitted until the time when the power-saving mode is released.

As described later, based on this prediction time and the power-consumption information table 170, the mode-switching decision section 103 calculates a period (i.e., Ts of FIG. 7 described later) between the time when switching is executed into the power-saving mode and the time when a return is executed to an ordinary operation. In other words, the mode-switching decision section 103 calculates a period of time (hereinafter, referred to as the "continuation period") when the information processing apparatus 1000 continues an operation in the power-saving mode. Using the continuation period, the mode-switching decision section 103 decides whether or not the operation mode should be switched from the ordinary mode to the power-saving mode.

In the case where the information processing apparatus 1000's operation mode is the power-saving mode, when the CPU 1, a memory 2 or a peripheral device which is an apparatus element is used, the information processing apparatus 1000 has to return to the ordinary operation by removing the power-saving mode. Therefore, the time when an apparatus element is next used is predicted, so that a prediction time can be obtained. Aiming to obtain a prediction time, the time prediction section 102 includes a timer-event prediction section 74 and a repetitive-interruption prediction section 73.

The timer-event prediction section 74 searches for a timer event which is registered by software (i.e., a program), such as the OS 100 and various device drivers (which may also be a part of the OS 100). Then, it obtains, as the prediction time, a period of time until the closest timer event, or the timer event in the nearest future to the present, is issued. The timer event is registered in the system so that a designated processing can be executed at a time designated by software. In order to realize the registration or execution of a timer event, the power-saving processing unit 10 includes a timer-event registration section 70, an event execution section 71 and a timer-list management queue 201.

For example, based on a registration request from an event issuance section 61A which is included in the task 61, the timer-event registration section 70 registers the requested event in the timer-list management queue 201. The timer-list management queue 201 is equivalent to a concrete example of the timer-event management section according to the present invention, and it manages a timer event. In the timer-list management queue 201, a timer event to be managed is updated as the time elapses, and thus, it is held in the RAM 22. In FIG. 2, the timer-list management queue 201 is shown to be excluded from the OS 100. However, it may also be a part of the OS 100.

Every time a cycled timer interruption is issued by the timer circuit 51, at that time, the event execution section 71 confirms by referring to the timer-list management queue 201 whether or not there is a timer event which should be executed by the system or the information processing apparatus 1000. The event execution section 71 executes all timer events which are registered as the ones that should be executed at the time.

When a timer event is executed, the CPU 1 needs to be used. Thus, it is frequently necessary to return the CPU 1 to its ordinary operation. Besides, as the CPU 1 operates, the memory 2 or a peripheral device is also used in many cases. Therefore, the time when a timer event is executed is read in advance, so that this time can be regarded as the time when the system or the information processing apparatus 1000 uses an apparatus element.

FIG. 5 is a representation, illustrating a form in which the timer-list management queue 201 manages a timer event. In FIG. 5, timer events A, B, an execution time 202 and an execution handler are information which is held by the timer-list management queue 201. For convenience, they are shown with taken out of the timer-list management queue 201.

As illustrated in FIG. 5, the time when a timer event is executed is managed so as to be discriminated. In the example of FIG. 5, using a list structure, the timer events are each connected and managed in order of the timer event A, the timer event B and a timer event C. In each timer event, there are managed: the time when its timer event is executed; an execution handler which is executed as a processing for the timer event; data (not shown) which is required when the execution handler is executed; and the like. In the example of FIG. 5, the execution time 202 of the timer event A is "5", which means that the timer event A is executed when the system's time becomes "5". The value "5" is an example, and the execution time 202 is expressed, for example, in the unit of msec.

The timer-event prediction section 74 of the time prediction section 102 searches the timer-list management queue 201. Thereby, it finds a nearby timer event A and acquires the execution time 202 which is registered in the timer event A. The timer-event prediction section 74 considers this execution time 202 to a device usage time. Then, it calculates its difference from a system time which is managed by the system, so that a prediction time can be obtained. The timer-event prediction section 74 notifies the mode-switching decision section 103 of the prediction time.

The repetitive-interruption prediction section 73 acquires a period of time 202 until an interruption processing cyclically executed by the system is executed. Then, it sees that time as the prediction time. Herein, the cycle means not only a fixed cycle, but also a repetition at dispersive time intervals.

The typical example of an interruption processing which is cyclically executed is a timer interruption which comes in a constant cycle from a hardware timer. In this case, a separate timer circuit from the timer circuit 51 (see FIG. 1) is connected to the bus line 50. Besides, in such a multi-CPU system as illustrated in FIG. 1, a periodic interruption for exchanging information with a separate CPU from a CPU which is now in execution is often brought from the separate CPU. In addition, there is also a periodic interruption from a peripheral device. There is also an interruption which enters in a fixed cycle according to a communication protocol from a communication-system device, a network device (an example of which is the communication unit 34 of FIG. 1), or the like. For example, if the system is a mobile phone, that system has to receive a radio wave in a certain cycle from a base station and respond to it.

When such an interruption processing is executed, in the same way as when a timer event is executed, the CPU 1 needs to be used. Thus, it is frequently necessary to return the CPU 1 to its ordinary operation. Besides, as the CPU 1 operates, the memory 2 or a peripheral device is also used in many cases. Therefore, a period of time from the present until such an interruption processing which is cyclically issued can be regarded as the prediction time.

In order to obtain a prediction time on the basis of the cycle of a cyclic interruption, the power-saving processing unit 10 includes an interruption record table 220, and the repetitive-interruption prediction section 73 includes a measurement section 72. FIG. 6 is a table, showing an example of the interruption record table 220. In the interruption record table 220, an interruption content 221, a state 222, a latest time interval 223, an average time interval 224, an average number of times 225 and a shortly-before interruption time 226 are recorded so as to relate to each other. In the interruption record table 220, recorded information is updated as the time passes, so that it is held in the RAM 22. In FIG. 2, the interruption record table 220 is shown to be excluded from the OS 100. However, it may also be a part of the OS 100.

The interruption content 221 is information which indicates the type of a cyclic interruption. For every interruption content, the measurement section 72 records a time when an interruption is latest issued as the shortly-before interruption time 226. Every time a new interruption is issued, the shortly-before interruption time 226 is updated. The measurement section 72 calculates the latest time interval 223 and the average time interval 224, every time a fresh interruption is issued. The latest time interval 223 is information which indicates the difference between a cyclic-interruption time immediately before and a cyclic-interruption time once ahead of it, in other words, the latest interruption interval. Every time a new interruption is issued, the measurement section 72 calculates the difference between a time when a fresh interruption is issued and the shortly-before interruption time 226 before updated. Then, it records the difference as the shortly-before interruption time 226.

Furthermore, every time a new interruption is issued, the measurement section 72 calculates the average value of latest interruption intervals over a predetermined number of times. Then, it records the average value as the average time interval 224. At the same time when the measurement section 72 records the average time interval 224, it records, as the average number of times 225, the average number of times at the time when it calculates the average time interval 224. In the example of FIG. 6, "ten times" is recorded as the average number of times 225.

Every time a new interruption is issued, based on the average time interval 224 and the average number of times 225 and the time when a fresh interruption is issued, the measurement section 72 newly calculates the average time interval 224. Even if the average number of times 225 is set to "ten times" at a steady operation, it falls short of "ten times", just after the system starts, or right after the interruption record table 220 begins to be created. The measurement section 72 executes an increment in the average number of times 225 one by one from the initial value "once". Thereby, it can calculate the average time interval 224 from the beginning. When the average number of times 225 is "once", the average time interval 224 is identical to the latest time interval 223.

Herein, the average time interval 224 is not necessarily the average value of interruption intervals for the past fixed number of times. It may also be the average value of all past interruption intervals. In this case, every time an interruption is issued, the average number of times 225 is unlimitedly given an increment of "one".

The measurement section 72 which manages the interruption record table 220 detects that a specific cyclic interruption illustrated in FIG. 6 has been issued. For example, the measurement section 72 detects that an interruption signal is transmitted from the interruption controller 55 to an arithmetic processing unit such as the CPU 1. Thereby, it detects a specific interruption being issued. Or the following method may also be used. Software such as the OS 100 discriminates an interruption from an object device or an apparatus element of the information processing apparatus 1000. When an interruption processing which corresponds to it is executed, a system time or a clock value of a hardware timer is acquired. Then, the measurement section 72 which is a part of the OS 100 is notified of such information.

In terms of each interruption content 221 of FIG. 3, the repetitive-interruption prediction section 73 which is included in the time prediction section 102 refers to, for example, the latest time interval 223 and the shortly-before interruption time 226. Thereby, it finds the time of an interruption which can be issued in the nearest future. Then, it sets the difference between this and the present time to the prediction time. In the repetitive-interruption prediction section 73, the latest time interval 223 may also be replaced with the average time interval 224.

Moreover, depending upon an operation situation of the system, there is a case where an interruption is set to be invalid. The state 222 is information which indicates whether or not an interruption is set to be invalid for each interruption content 221. For example, if the interruption controller 55 is set to mask an interruption, a masked interruption is not accepted. For such a masked interruption, "invalid" is recorded as the state 222. In this case, a part (not shown) inside of the OS 100 detects a setting state of the interruption controller 55 is set, so that the setting state can be recorded in the state 222.

Furthermore, without setting a mask in the interruption controller 55, the setting of valid/invalid for each interruption content 221 can be executed, using software such as the OS 100. In this case, a part of the OS 100 or the like in which such a setting is executed can record the setting contents in the state 222.

The repetitive-interruption prediction section 73 also refers to the state 222 when acquiring a prediction time. The repetitive-interruption prediction section 73 refers to data such as the latest time interval 223 only on the interruption content 221 in which the state 222 is not set to be "invalid". Thereby, the repetitive-interruption prediction section 73 can acquire a prediction time more precisely.

Herein, from the interruption record table 220, instead of a period of time until a power-saving mode is cancelled, the repetitive-interruption prediction section 73 can also acquire, the prediction time, a period of time (i.e., Tu+Ts+Td of FIG. 7 described later) until a return is given from the power-saving mode to an ordinary mode. Instead of the shortly-before interruption time 226 which is recorded in the interruption record table 220, after an interruption, a return is given to the ordinary mode. Then, the time when a predetermined device (i.e., an apparatus element of the information processing apparatus 1000) starts an operation can be recorded. In this case, on the basis of the shortly-before interruption time 226, the repetitive-interruption prediction section 73 can acquire, as the prediction time, the period of time until a return is given from the power-saving mode to the ordinary mode.

Moving back to FIG. 2, the time prediction section 102, for example, makes a prediction time which is obtained in the timer-event prediction section 74 the first candidate, and makes a prediction time which is obtained in the repetitive-interruption prediction section 73 the second candidate. Then, it notifies the mode-switching decision section 103 of a candidate closer to the present as the prediction time.

Based upon management information which is managed by the power-consumption information management section 101 and a prediction time which is predicted by the time prediction section 102, the mode-switching decision section 103 decides whether or not the current ordinary mode should be switched into the power-saving mode. The power-consumption information management section 101 transmits the power-consumption information table 170 which it manages by itself to the mode-switching decision section 103.

Figure 7:
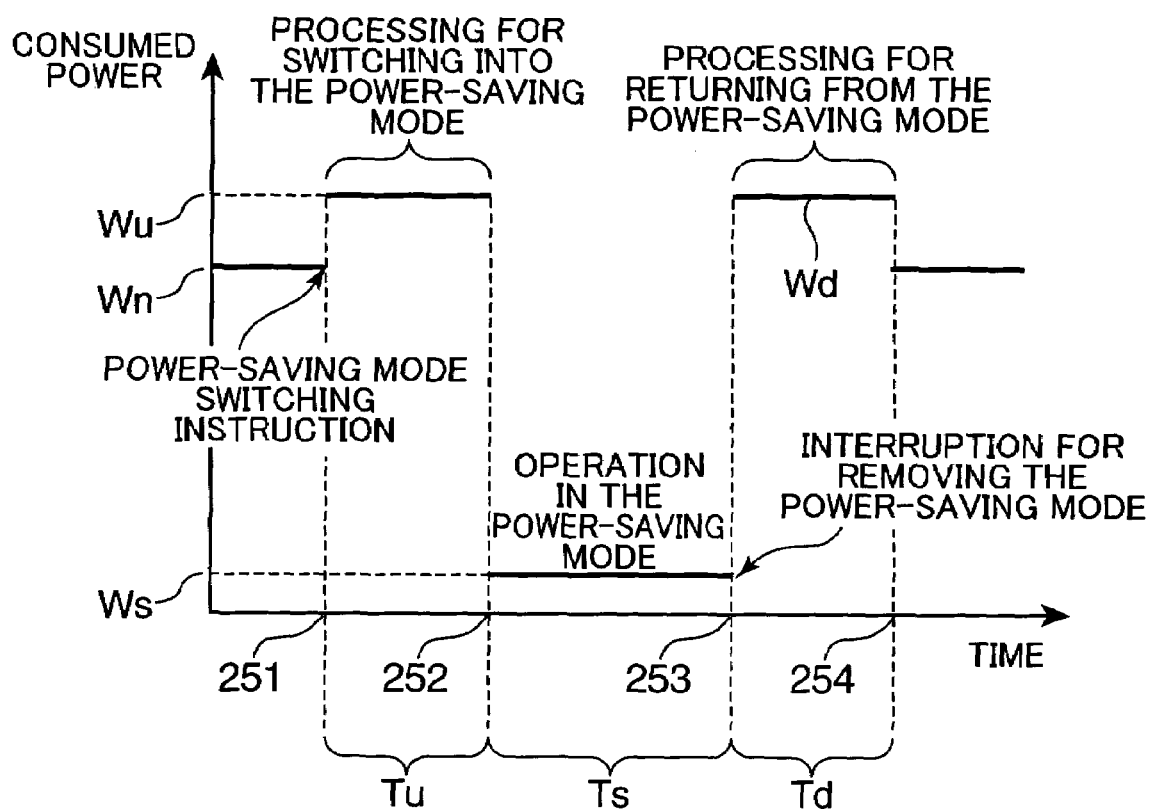
FIG. 7 is a graphical representation, showing an operation of a mode-switching decision section in FIG. 1.

FIG. 7 is a graphical representation, showing an operation of the mode-switching decision section 103. It illustrates the transition of a consumed power as the operation mode is switched. In FIG. 7, the vertical axis indicates a consumed power (mW) and the horizontal axis indicates a time. When the system's operation mode is an ordinary mode, the consumed power is at a height of Wn. If a request to switch into a power-saving mode is issued at a time 251, a processing for switching into the power-saving mode, in short, a shift processing, is executed. Thereby, the consumed power usually becomes higher. This is, first of all, because in the ordinary mode immediately before switching is executed from the ordinary mode to the power-saving mode, in many cases, the system does not usually bear a large quantity of processing. Secondly, as the processing for switching into the power-saving mode, a processing needs to be executed for changing the setting of various devices (i.e., an apparatus element). Thus, a high power is consumed in this processing. In the example of FIG. 7, in order to switch into the power-saving mode, the processing takes a period Tu from the time 251 to a time 252. A consumed power Wu during the period becomes higher than Wn before switching is executed into the power-saving mode.

At the time 252, a shift processing is completed which is a preprocessing for switching into the power-saving mode.

Then, the switching is executed into the power-saving mode, thereby reducing the consumed power to a level of Ws. The consumed power Ws is lower than the consumed power Wn in the ordinary mode. An operation in the power-saving mode continues, with the consumed power kept at the level of Wd, over a continuation period Ts until a time 253 when an interruption is issued for lifting the power-saving mode. At the time 253, the interruption for lifting the power-saving mode is issued, the system executes a processing for returning from the power-saving mode, or a return processing. In the return processing, the setting of various devices has to be changed, in the same way as the shift processing. The power which is required for such a processing is consumed. Therefore, the consumed power Wd which is spent in the return processing rises up to the level which is equal, or close, to the consumed power Wu.

The return processing from the power-saving mode to the ordinary mode takes a processing time of a period Td from the time 253 to a time 254. At the time 254, if the return processing as a preprocessing of the ordinary mode is completed, the operation mode returns to the ordinary mode.

As described above, switching into the power-saving mode requires the processing period Tu when switching is executed into the power-saving mode and the processing period Td when a return is given from the power-saving mode. Therefore, even if switching is executed into the power-saving mode, that is not necessarily advantageous. There is a case where maintaining the ordinary operation mode without switching into the power-saving mode is more advantageous.

When being informed of the switching request into the power-saving mode, the mode-switching decision section 103 decides, based on the above described situation, whether or not the switching into the power-saving mode should be executed. Herein, the mode-switching decision section 103 may also directly receive the switching request from the mode-switching instruction section 75. However, it may also receive it indirectly through the power-consumption information management section 101 or the time prediction section 102. FIG. 2 illustrates the latter.

Hereinafter, a number of examples will be described about a decision criteria and a decision procedure when the mode-switching decision section 103 executes such switching. First, an example is given in which the mode-switching decision section 103 makes such a decision on the basis of a processing time.

If the processing period Tu when switching is executed into the power-saving mode is longer than the period Tu+Ts from the time when a switching request is issued to the time when the power-saving mode is lifted, that means a period of time from the time when switching is executed into the power-saving mode until the time when the power-saving mode is lifted, or the continuation period Ts, does not exist. In this case, without realizing an operation in the power-saving mode, the operation mode returns to the ordinary operation. This wastes the time which is taken in the shift processing for switching into the power-saving mode and in the return processing for returning from the power-saving mode. Besides, such a shift processing or return processing may delay a processing which can be executed in a prompt response when the ordinary-mode operation is maintained. Thus, a response by the processing can be delayed.

Therefore, on the basis of the correlation between a prediction time (Tu+Ts, or Tu+Ts+Td) which is received from the time prediction section 102, and the processing period Tu for the shift processing or the processing period Td for the return processing, the mode-switching decision section 103 decides whether or not switching should be executed into the power-saving mode. For example, when the prediction time is obtained as Tu+Ts, if the prediction time is shorter than the processing period Tu, the mode-switching decision section 103 decides that switching should not be executed into the power-saving mode. In addition, when the prediction time is obtained as Tu+Ts+Td, if the prediction time is shorter than the sum of the processing period Tu and the processing period Td, the mode-switching decision section 103 decides that switching should not be executed into the power-saving mode. In another example, only if a decision made that the prediction time is long enough to exceed a value which is obtained by adding a certain positive constant to the processing period Tu or the sum Tu+Td of the processing period, then the mode-switching decision section 103 decides that switching should be executed into the power-saving mode.

The above described example can also be put in other words. The mode-switching decision section 103 first calculates a period of time when the system can work in the power-saving mode, or the continuation period Ts. If the prediction time is obtained as Tu+Ts, the continuation period Ts is obtained by subtracting the processing period Tu from the prediction time. On the other hand, if the prediction time is obtained as Tu+Ts+Td, the continuation period Ts is obtained by subtracting the processing period Tu+Td from the prediction time.

The mode-switching decision section 103 refers to the power-consumption information table 170 which the power-consumption information management section 101 gives notice of. Thereby, it can obtain the processing period Tu and Td. Herein, the power-consumption information management section 101 transmits the power-consumption information table 170 to the mode-switching decision section 103. Instead, the mode-switching decision section 103 may also refer to the power-consumption information table 170 which is managed by the power-consumption information management section 101.

The mode-switching decision section 103 decides that switching should not be executed into the power-saving mode, for example, if the continuation period Ts is a negative value. If it is a positive value, it decides that the switching should be executed. In another example, if the continuation period Ts is equal to, or more than, a given positive constant, then the mode-switching decision section 103 decides that the switching should be executed. On the other hand, if it is less than the positive constant, it decides that the switching should not be executed. In other words, the mode-switching decision section 103 decides that the switching should be executed, only when the continuation period Ts is long enough.

Next, an example is given in which the mode-switching decision section 103 makes a decision based on a power consumption. First, using a prediction time which is received from the time prediction section 102, the mode-switching decision section 103 calculates the continuation period Ts. Then, the mode-switching decision section 103 acquires, from the power-consumption information table 170, a power consumption (Wu×Tu) which is required in the shift processing for shifting into the power-saving mode and a power consumption (Wd×Td) which is required in the return processing for returning from the power-saving mode to the ordinary operation. Or, the mode-switching decision section 103 may also calculate the power consumption (Wu×Tu) which is required in the shift processing by acquiring the consumed power Wu which is required in the shift processing and the processing period Tu which is required in the shift processing. Similarly, the mode-switching decision section 103 may also calculate the power consumption (Wd×Td) which is required in the return processing by acquiring the consumed power Wd which is required in the return processing and the processing period Td which is required in the return processing.

Furthermore, the mode-switching decision section 103 acquires, from the power-consumption information table 170, the consumed power Ws during the continuation period Ts when the operation is executed in the power-saving mode. Using the continuation period Ts and the consumed power Ws, the mode-switching decision section 103 calculate a power consumption (Ws×Tu) during the continuation period Ts. Thereby, when switching is executed into the power-saving mode, the mode-switching decision section 103 calculate a whole power consumption (Wu×Tu+Ws×Ts+Wd×Td) over all a period of Tu+Ts+Td as the sum of the three kinds of power consumptions.

Moreover, the mode-switching decision section 103 acquires, from the power-consumption information table 170, the consumed power Wn at the time when the operation is executed in the ordinary mode. The consumed power Wn is given beforehand to the mode-switching decision section 103 as a constant. In addition to this, there are various acquisition forms within a known art. On the basis of the consumed power Wn, the mode-switching decision section 103 calculate a whole power consumption (Wn×(Tu+Ts+Td)) over the above described entire period Tu+Ts+Td in the case where the operation mode is not switched.

Base upon the above described results, the mode-switching decision section 103 compares the whole power consumption when switching is executed into the power-saving mode and that when the switching is not executed. On the basis of this result, it decides whether or not the switching is executed into the power-saving mode. For example, if the whole power consumption when switching is executed into the power-saving mode is greater than the whole power consumption when the switching is not executed, such switching into the power-saving mode does not produce any power saving effect. Hence, the mode-switching decision section 103 decides that the switching should not be executed into the power-saving mode. In contrast, if the whole power consumption when switching is executed into the power-saving mode is less than the whole power consumption when the switching is not executed, such switching into the power-saving mode produces a power saving effect. Hence, the mode-switching decision section 103 decides that the switching should be executed into the power-saving mode.

In another example, base upon the above described comparison result, the mode-switching decision section 103 decides that the switching should be executed into the power-saving mode, only in the case where the whole power consumption when switching is executed into the power-saving mode is equal to, or less than, a value which is obtained by subtracting a given margin (or a positive number) from the whole power consumption when the switching is not executed. Thereby, only in the case where a power saving effect is obtained which is great enough to compensate for a response delay that is caused by the switching, the switching can be executed into the power-saving mode.

The mode-switching decision section 103 sends the decision result to the mode-switching execution section 104. Only if deciding that switching should be executed into the power-saving mode, the mode-switching decision section 103 may also notify the mode-switching execution section 104 of the fact.

According to the decision of the mode-switching decision section 103, the mode-switching execution section 104 switches the operation mode, so that each operation mode is realized. Specifically, when being notified of switching into the power-saving mode by the mode-switching decision section 103, the mode-switching execution section 104 switches the system's operation mode into the power-saving mode. The mode-switching execution section 104 refers to, for example, the power-saving mode table 150. Thereby, it executes, in each apparatus element, an operation which corresponds to the power-saving mode into which a shift should be given. In order to apply a power-saving processing to each apparatus element which is subjected to a power-saving mode, the mode-switching execution section 104 executes, in a predetermined procedure, various kinds of processing as well which accompanies an operation that is recorded in the power-saving mode table 150.

In general, in the case where a power-saving processing is executed, such as turning off the power source of each apparatus element, setting it in a standby mode and bringing it to a stop, a processing is necessary for storing temporary information, volatile data or the like which is held in an ordinary operation. This helps normally operate sequentially after a return is given to the ordinary operation from the power-saving mode. Besides, there is a case where a connected peripheral device is notified that its power source is turned off, put into a standby mode or brought to a halt. Thereby, it can cope with the fact that it will be unable to transmit and receive data.

For example, let's assume a case where the power source of a volatile external memory (not shown in FIG. 1) is switched off. First, among the pieces of data which are held in the external memory, the piece of data which is written only in the external memory has to be reflected in its initial position of a storage unit. Or, it needs to be moved into a separate temporary storage unit. In addition, a refreshing signal or an activation signal that it received periodically from a separate connected peripheral device when it was turned on sometimes has to be masked.

Furthermore, when the state of each apparatus element is changed, a wait also has to be given for the state of each apparatus element to become stable after a predetermined setting is executed in each apparatus element. For example, in the case where a supplied voltage is lowered as a CPU clock frequency becomes lower, the CPU 1 has to be stopped at the time when a voltage supply source changes the voltage, or until the time when the voltage is stabilized.

The mode-switching execution section 104 executes a predetermined processing for implementing a power-saving mode, including the above described processing.

In the power-saving processing unit 10 which has such a configuration as described so far, its operation will be described with reference to a flow chart in FIG. 8. In the power-saving processing unit 10, a processing is started by turning on a power source or through another such operation. Then, the power-consumption information management section 101 manages management information such as the power-consumption information table 170. At the same time, the time prediction section 102 manages the interruption record table 220 (in a step S101).

Next, a request to switch into a power-saving mode for the purpose of restraining a power consumption, or a switching instruction, is issued. Then, the power-saving processing unit 10 executes the processing of a step S102 and the following steps. Sequentially, the step S101's processing is executed in parallel with the processing of the step S102 and the following steps.

In the step S102, the time prediction section 102 calculates a prediction time. Next, the mode-switching decision section 103 acquires management information such as the power-consumption information table 170 from the power-consumption information management section 101. Then, it acquires the prediction time from the time prediction section 102 (in a step S103). Next, the mode-switching decision section 103 compares processing times or entire power consumptions in the case where switching is executed into a power-saving mode and in the case where it is not executed (in a step S104). Sequentially, based on the comparison result, the mode-switching decision section 103 decides whether or not the switching into a power-saving mode is effective (in a step S105). Next, based on the decision result, the mode-switching execution section 104 executes the switching into a power-saving mode (in a step S106).

As described above, in the power-saving processing unit 10 according to the first embodiment of the present invention, taking into account an overhead processing time or power consumption when switching is executed into a power-saving mode, a decision is made whether the switching should be executed into a power-saving mode. This helps achieve more advantageous power-saving control, or more precise power-saving control.

Second Embodiment

In the above described first embodiment, as a method in which the time prediction section 102 predicts a time when a device or an apparatus element is used, a timer event is searched. Then, a period of time until a nearby timer event is issued is considered to be a time when an operation in a power-saving mode can be executed. However, when a certain timer event is issued, in the timer event, an apparatus which a power-saving processing is applied to is not necessarily used with returned to its ordinary operation.

For example, in a certain timer event, a code is loaded from an external memory, and then, a predetermined processing may only be executed in an arithmetic processing unit or the CPU 1. In that case, there is every possibility that a network interface or the communication unit 34 is not used. In such a case, for example, in terms of the power-saving mode of "turning off a network interface" which corresponds to an identification number "4" shown in FIG. 3, there is no need to release the power-saving mode in the timer event.

Hence, depending upon a timer event, only a predetermined device is used, or a predetermined device is not used. If they can be identified, then for a requested power-saving mode, the time when an operation in a power-saving mode can be executed can be accurately predicted.

An operation in which the time prediction section 102 executes the identification, and using a timer event, predicts a time when a device is used, will be described with reference to FIG. 9. FIG. 9 is a representation, illustrating a form in which a timer-list management queue according to a second embodiment of the present invention manages a timer event. Herein, FIG. 9 corresponds to FIG. 5 according to the first embodiment. This timer-list management queue 201A is replaced with the timer-list management queue 201 in FIG. 2.

The timer-list management queue 201A manages device usage information which corresponds to each timer event. In other words, each timer event is accompanied by device usage information, in addition to an execution time and an execution handler which is also shown in FIG. 5. For example, in a timer event A, as device information, information 301 is managed that an external memory is not used and a network interface is not used. Besides, in a timer event B, as device information, information 302 is managed that a network interface is not used.

When the timer-event registration section 70 (see FIG. 2) registers a timer event in the timer-list management queue 201A, based on the timer event's specification, it can preset the device usage information 301 or 302. In addition, when a timer event is executed, the time prediction section 102 stores a device which has been accessed in the timer event. Then, on the basis of that information, the time prediction section 102 or the timer-event registration section 70 may also set device usage information in the timer-list management queue 201A.

Let's assume that in the power-saving mode table 150 shown in FIG. 3, the power-saving mode of "making an external memory sleep" which corresponds to the identification number "1" is requested as the switching destination. The time prediction section 102 searches for a timer event which is managed by the timer-list management queue 201A of FIG. 9. Then, it refers to the device usage information 301 of the timer event A and obtains information that an external memory is not used in the timer event A. In other words, this timer event A is judged to be a timer event which does not need to be returned from the power-saving mode of "making an external memory sleep".

The time prediction section 102 further searches for a managed timer event. Then, it refers to the device usage information 302 of the timer event B and obtains information that a network is not used in the timer event B. As can be seen from the example of FIG. 9, if an unused device is registered in device usage information, the time prediction section 102 decides there is some possibility that an external memory will be used in the timer event B. Then, it refers to an execution time 303 which is registered in the timer event B. The time prediction section 102 regards the execution time 303 as a device usage time and calculates its difference from a system time which is managed in the system. Thereby, it obtains a period of time (Tu+Ts) until an operation in the power-saving mode is removed. The time prediction section 102 considers that time to be the prediction time and notifies the mode-switching decision section 103 of it.

Moreover, as another example, there is a case where in the power-saving mode table 150 shown in FIG. 3, the power-saving mode of "turning off a network interface" which corresponds to the identification number "4" is requested as the switching destination. In this case, the information that a network interface is not used is included in the device usage information 302 and 302 of the timer event A and the timer event B. Therefore, the time prediction section 102 refers to the device usage information of a timer event C. If there is no device usage information, as is the case with the timer event C, then the time prediction section 102 decides that all devices can be used. Based on an execution time 304 of the timer event C, it predicts a time when a power-saving mode operation can be executed.

Herein, in FIG. 9, the information that a specific device is not used is illustrated as device usage information which corresponds to a timer event. However, the timer-list management queue 201A may also manage the information that a specific device is used. In that case, the time prediction section 102 decides, among the pieces of device usage information which record a device that is used in a timer event, whether or not there is the one that includes a part of a device to which a power-saving processing is applied as a requested power-saving mode is executed. Then, the time prediction section 102 sees, a time when the device is used, an execution time of a timer event which is accompanied by such device usage information. Sequentially, it calculates a time when a power-saving mode operation can be executed.

Next, an operation in which the time prediction section 102 identifies a used apparatus, and based on a cyclic interruption processing, predicts a time when a device is used, will be described with reference to FIG. 10. FIG. 10 is a table, illustrating an interruption record table 220A according to the second embodiment. Herein, FIG. 10 corresponds to FIG. 6 according to the first embodiment. This interruption record table 220A is replaced with the interruption record table 220 in FIG. 2.

In the interruption record table 220A, similarly to the interruption record table 220 of FIG. 6, an interruption content 221, a state 222, a latest time interval 223, an average time interval 224, an average number of times 225 and a shortly-before interruption time 226 are recorded so as to relate to each other. In the interruption record table 220A, device usage information 355 is recorded so as to relate with the interruption content 221 or the like.

Using the device usage information 355, the time prediction section 102 can predict more precisely a time when a device is used. Depending upon a power-saving mode, when a specific interruption is actually issued, there is some possibility that the power-saving mode is not cancelled. This is because in all pieces of cyclic interruption processing, a-device to which a power-saving processing in a power-saving mode is applied is not necessarily used. Thus, the time prediction section 102 does not regard a time when a cyclic interruption is issued which is expected to be closest to the present as a time when a device is used next. Instead, the device usage information 355 is used which is managed for each interruption content 351. Thereby, the time prediction section 102 can acquire a prediction time more accurately for a requested power-saving-mode.

Concretely, in the same way as the case of the above described timer event, in terms of each device which undergoes a power-saving processing in a power-saving mode that is given a switching request, the time prediction section 102 decides, using the device usage information 355 whether the device is used in a cyclic interruption. The device usage information 355 can be preset in an execution handler which executes a cyclic interruption, and it can be read by the time prediction section 102. Besides, when a cyclic interruption is executed, the time prediction section 102 may also store which device the cyclic interruption had access to. In that case, based on the information, the time prediction section 102 sets the device usage information 355.

For example, let's assume that the power-saving mode of "making an external memory sleep" is requested which corresponds to the identification number "1" of FIG. 3. The time prediction section 102 searches the interruption record table 220A of FIG. 10. First, it refers to the device usage information 355 of the first "timer interruption" and obtains information that an external memory is not used. Thereby, the time prediction section 102 can decide that the power-saving mode of "making an external memory sleep" is lifted by the timer interruption and a return is not given into the ordinary mode.

Next, the time prediction section 102 refers to the device usage information 355 of the second cyclic interruption "periodic interruption from another CPU" in FIG. 10. As a result, there is no information that an external memory is not used. Thus, the time prediction section 102 can decide that an external memory is not used in the second cyclic interruption. In other words, the time prediction section 102 decides that the latest time interval 223 or the average time interval 224 which corresponds to the second cyclic interruption of FIG. 10 is a time which is effective for the power-saving mode of "making an external memory sleep".

As described above, among the pieces of cyclic interruption information which are managed in the interruption record table 220A illustrated in FIG. 10, an effective time interval is referred to, taking into account the device usage information 355. This helps predict more precisely an operation time in a power-saving mode. Besides, similarly to the case of the above described timer event, not information that a specific device is not used but information that a specific device is used can also be recorded as the device usage information 355.

Third Embodiment

In the power-consumption information table 170 illustrated in FIG. 4, the overhead power consumptions 171 and 172 are recorded which are caused by switching from an ordinary mode to a power-saving mode. However, when the current operation mode is one of power-saving modes, the information processing apparatus 1000 can also be configured so that the operation mode is switched into another power-saving mode. When the operation mode is switched from one power-saving mode to another power-saving mode, the difference in the state between each apparatus becomes less than when it is switched from an ordinary mode to a power-saving mode. There is some possibility that an overhead power consumption is reduced when the operation mode is switched.

Even in such a case, in order to acquire a power consumption with high precision when the operation mode is switched, when it is switched from one power-saving mode to another power-saving mode, a power consumption can be managed after the operation-mode switching. Consequently, it can be used for the decision whether or not the operation mode should be switched.

FIG. 11 is a table, showing an example of a power-consumption information table in which switching between optional modes of an ordinary mode and several power-saving modes can be dealt with. This power-consumption information table 170A is replaced with the power-consumption information table 170 in FIG. 2. In the power-consumption information table 170A illustrated in FIG. 11, two kinds of power-consumption and consume power are arranged in a matrix form. In FIG. 11, a current operation mode is laterally disposed and an operation mode at a shift destination is longitudinally disposed. For example, when a decision is made whether or not switching should be executed from an operation mode "1" which is a power-saving mode to another power-saving mode "3", the mode-switching decision section 103 may refer to power consumptions 171A, 172A and a consumed power 173A which are recorded on line 4 and row 2 (or longitudinally in the fourth line and laterally in the second row). In order to calculate a total power consumption when switching is not executed from the operation mode "1", the mode-switching decision section 103 may refer to a consumed power 173 which is recorded on line 2 and row 1.

When switching is executed from a power-saving mode to an ordinary mode, the mode-switching decision section 103 is not usually expected to decide whether or not the switching should be executed. However, when switching is executed from a power-saving mode to an ordinary mode, using the power-consumption information table 170A, the mode-switching decision section 103 can also decide whether or not the switching should be executed.

Figure 12:
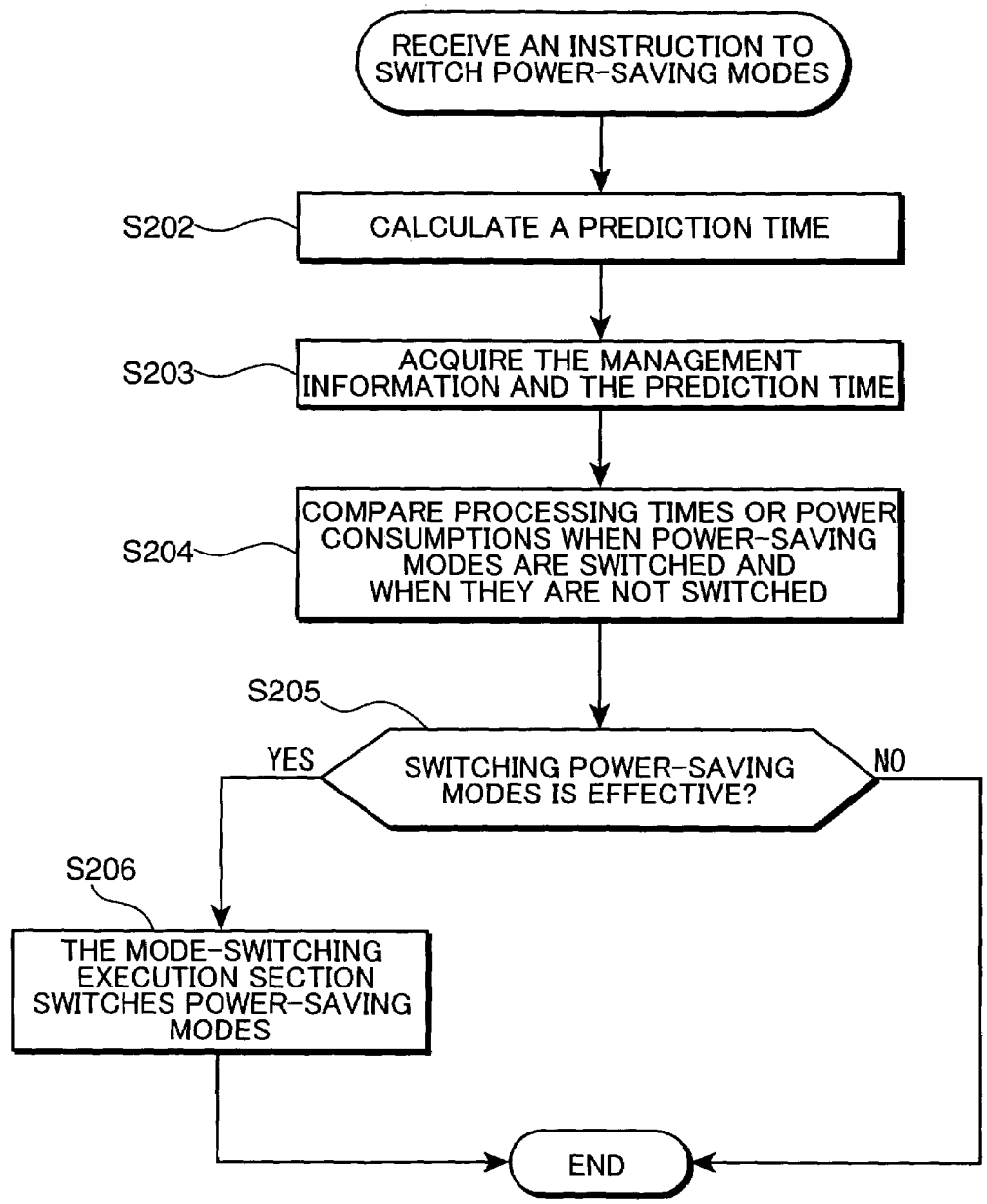
FIG. 12 is a flow chart, showing an operation procedure of a power-saving processing unit according to the third embodiment of the present invention.

FIG. 12 is a flow chart, showing an operation procedure of the power-saving processing unit 10 according to a third embodiment of the present invention. This processing is executed after the operation mode is switched into one power-saving mode in the processing of FIG. 8. Herein, in the step S101 of FIG. 8, instead of the power-consumption information table 170, the power-consumption information management section 101 manages the power-consumption information table 170A as a piece of management information. When a request is issued to switch a current power-saving mode into another power-saving mode, first, in the power-saving processing unit 10, the time prediction section 102 acquires a prediction time (in a step S202).

Next, from the power-consumption information management section 101, the mode-switching decision section 103 acquires management information, such as the power-consumption information table 170A. Then, it acquires the prediction time from the time prediction section 102 (in a step S203). Next, the mode-switching decision section 103 compares processing times or entire power consumptions in the case where switching is executed into another power-saving mode and in the case where it is not executed (in a step S204). Sequentially, based on the comparison result, the mode-switching decision section 103 decides whether or not the switching into a power-saving mode is effective (in a step S205). Next, based on the decision result, the mode-switching execution section 104 executes the switching into a power-saving mode (in a step S206).

According to the above described procedure, even if the operation mode is switched between different power-saving modes, proper switching can be realized, considering a power consumption which is required in a shift processing and a return processing.

Fourth Embodiment

A power-saving processing unit according to a fourth embodiment of the present invention, not only decides whether or not switching should be executed into a specific power-saving mode, but also has the following function. Among a plurality of power-saving modes which are prepared by the system or the information processing apparatus 1000, it has the function of choosing and executing the most suitable power-saving mode. This helps realize a power-saving processing more accurately.

Hereinafter, the power-saving processing unit according to the fourth embodiment will be described. The power-saving processing unit according to the fourth embodiment of the present invention has an identical configuration with that of the power-saving processing unit 10 in FIG. 2. However, as illustrated in FIG. 3 and FIG. 4, although several power-saving modes are prepared, the mode-switching instruction section 75 makes a request to switch from an ordinary mode to a power-saving mode, without designating a mode at a shift destination. Besides, for all except a current mode among the prepared power-saving modes, the time prediction section 102 calculates a prediction time when a shift is given into them.

Among the prepared power-saving modes, for all except a current mode, the mode-switching decision section 103 calculates all power consumptions when switching is executed into them. Then, it chooses, as the most suitable shift destination, the lowest power-consumption mode from among all the power consumptions. Instead of comparing all the power consumptions, the mode-switching decision section 103 may also choose, as the most suitable power-saving mode, the longest mode of the continuation period Ts after a mode shift. Besides, in terms of the power-saving mode it has chosen, the mode-switching decision section 103 may also decide whether or not it is appropriate that switching be executed from an ordinary mode to that power-saving mode, in the same way as the mode-switching decision section 103 according to the first embodiment. Similarly to the case according to the first embodiment, based on the decision result of the mode-switching decision section 103, the mode-switching execution section 104 executes switching into a mode.

Figure 13:
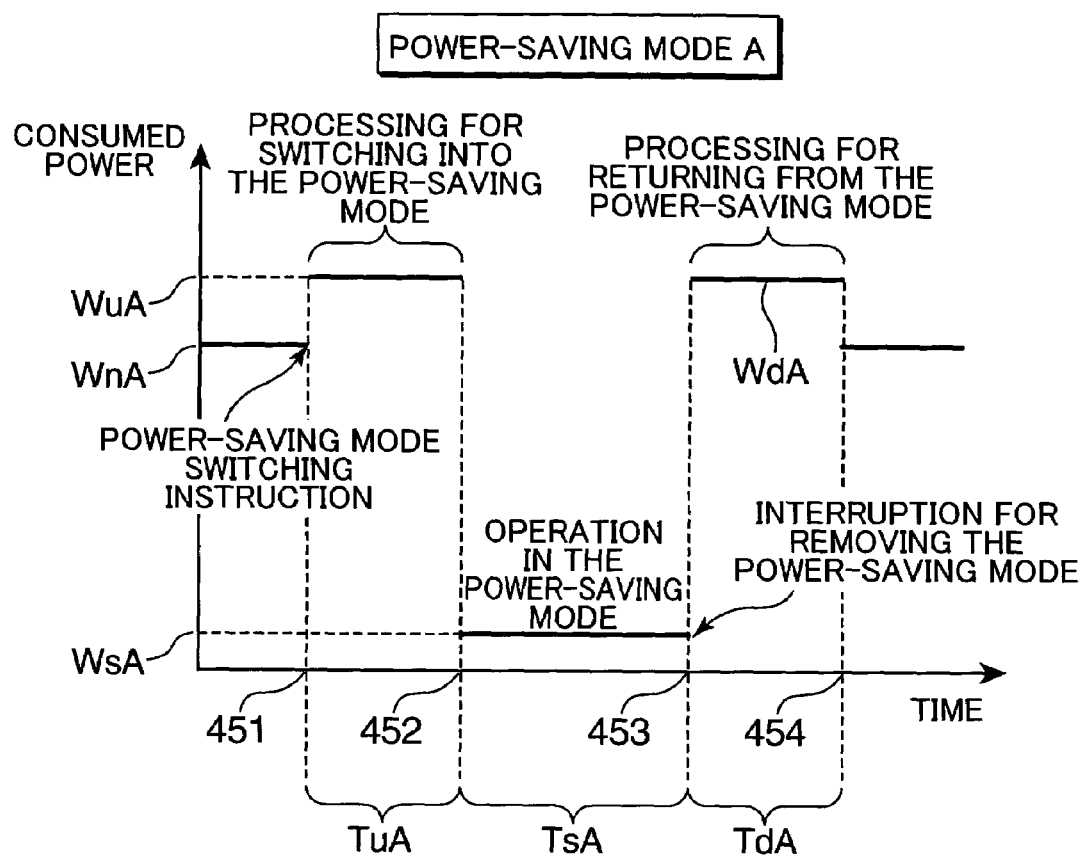
FIG. 13 is a graphical representation, showing an operation of a mode-switching decision section according to a fourth embodiment of the present invention.
Figure 14:
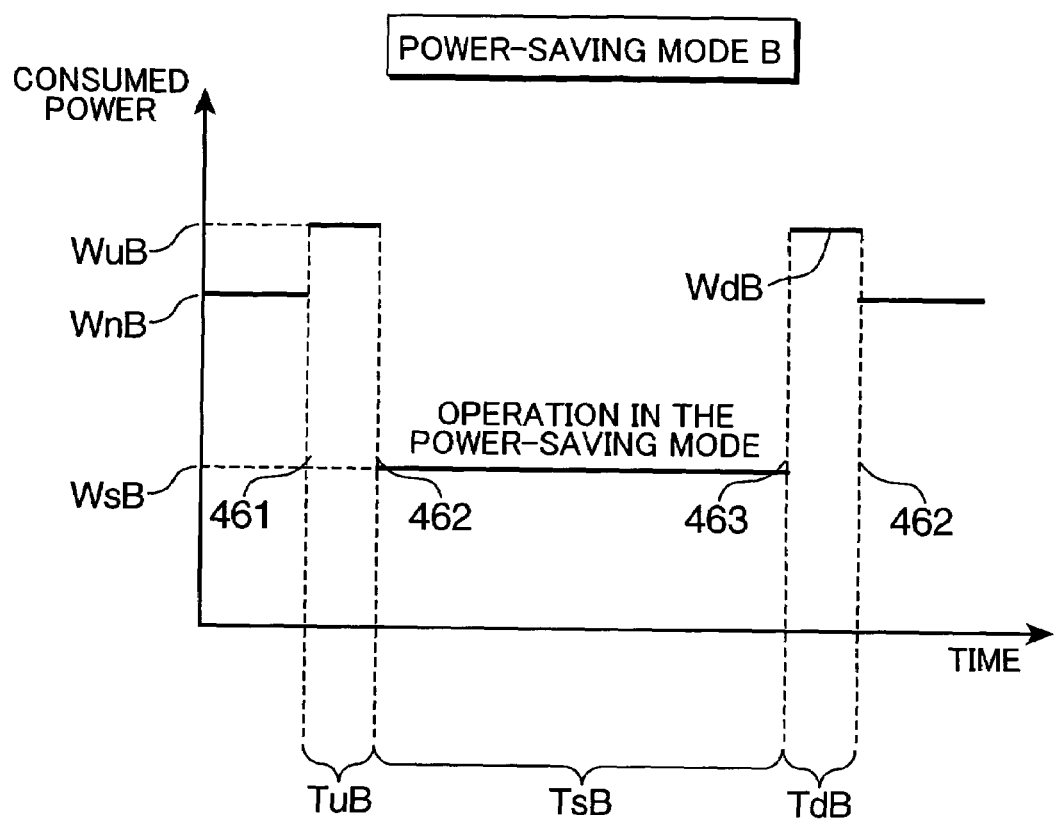
FIG. 14 is a graphical representation, showing an operation of the mode-switching decision section according to the fourth embodiment of the present invention.
Figure 15:
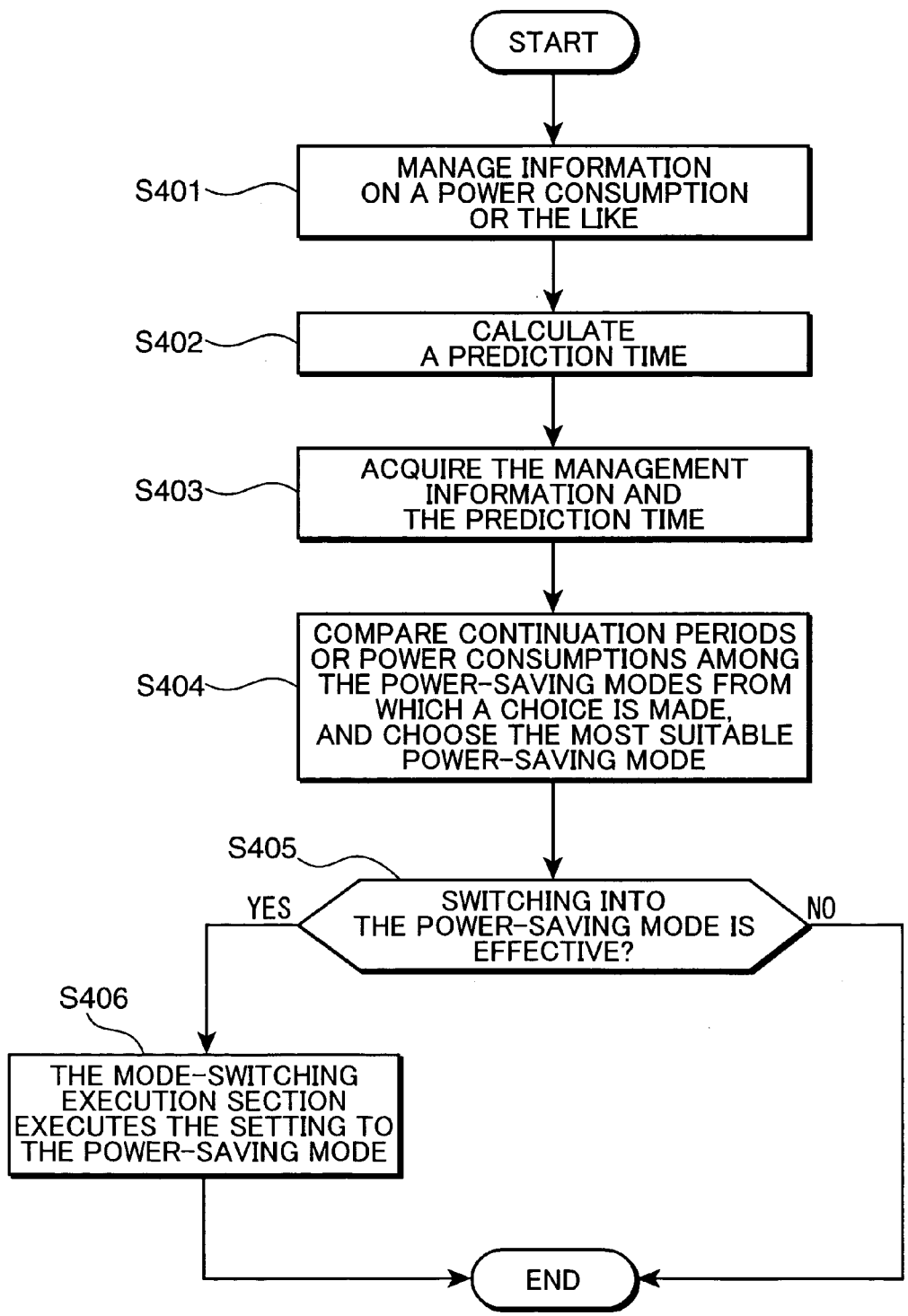
FIG. 15 is a flow chart, showing an operation procedure of a power-saving processing unit according to the fourth embodiment of the present invention.

FIG. 13 and FIG. 14 are each a graphical representation, showing an operation of the mode-switching decision section 103. They each illustrate the transition of a consumed power (mW) as the operation mode is switched. FIG. 13 and FIG. 14 each show the transition of a consumed power when switching is executes into two kinds of power-saving modes which are a power-saving mode A and a power-saving mode B. They are shown so as to be contrasted each other.

In general, if a power consumption is kept down so that a greater power-saving effect can be obtained, a greater overhead is required. A continuation period when an operation can be executed in a power-saving mode is predicted. Then, the overheads of power consumption or processing time which are taken for a shift processing for switching into the power-saving mode and a return processing for returning to an ordinary mode, are calculated, and they are compared each other. Thereby, the trade-off is resolved so that the most suitable power-saving mode can be chosen.

If the power-saving mode A is compared with the power-saving mode B, the former takes a less consumed power (mW) during an operation in a power-saving mode. Hence, the former has a greater power-saving effect per unit time. With reference to FIG. 13 and FIG. 14, if the system works in the power-saving mode A over the continuation period from a time 452 to a time 453, the consumed power is WsA. It is less than a consumed power WsB in the case where it works in the power-saving mode B over the continuation period from a time 462 to a time 463.

However, an overhead at the time when switching is executed into the power-saving mode A is greater than that at the time when switching is executed into the power-saving mode B. With reference to FIG. 13 and FIG. 14, a processing time TuA from a time 451 to the time 452 which is taken for a shift processing for switching into the power-saving mode A is longer than a processing time TuB from a time 461 to the time 462 which is taken for a shift processing for switching into the power-saving mode B. As a result, a power consumption (mJ) which is spent for a shift processing becomes greater when switching is executed into the power-saving mode A. Similarly, a processing time TdA from the time 453 to a time 454 which is taken for a return processing for returning from the power-saving mode A to an ordinary mode is longer than a processing time TdB from the time 463 to a time 464 which is taken for a return processing for returning from the power-saving mode B to the ordinary mode. Consequently, a power consumption which is spent for a return processing becomes greater when a return is given from the power-saving mode A to the ordinary mode.

For example, in terms of the power-saving mode A shown in FIG. 13, the mode-switching decision section 103 calculates all power consumptions from the time when a request is made to switch into the power-saving mode at the time 451 until the time when a return is given to the ordinary mode at the time 454, on the basis of a power consumption and a time at each interval. A power consumption which is required for a shift processing for switching into the power-saving mode A can be calculated as the product (WuA×TuA) of WuA and TuA. Besides, a power consumption during a continuation period when an operation is executed in the power-saving mode A can be calculated as the product (WdA×TsA) of WdA and TsA. In addition, a power consumption which is required for a return processing for returning from the power-saving mode A to the ordinary mode can be calculated as the product (WuA×TdA) of WuA and TdA. A power consumption which is spent from a switching request into the power-saving mode A until the return is calculated, using the total sum of the above described power consumptions at each interval.

For example, in terms of the power-saving mode B shown in FIG. 14, the mode-switching decision section 103 calculates all power consumptions, on the basis of a power consumption and a time at each interval. All power consumptions for the power-saving mode B is calculated, using the total sum of WuB×TuB which is consumed in a shift processing into the power-saving mode B, WdB×TsB which is consumed during a continuation period in operation in the power-saving mode B and WuB×TdB which is spent in a return processing from the power-saving mode B to the ordinary mode.

In terms of each power-saving mode which can be adopted as a shift destination by the system, based on the power-consumption information table 170 which is transferred from the power-consumption information management section 101 and a prediction time in each power-saving mode which is sent from the time prediction section 102, the mode-switching decision section 103 calculates the total sum of all power consumptions, in the procedure illustrated in the power-saving modes A and B. Besides, from among all the power consumptions it have calculated, the mode-switching decision section 103 chooses a power-saving mode which has the minimum ones.

In the power-saving processing unit 10 according to the fourth embodiment which has such a configuration as described so far, its operation will be described with reference to a flow chart in FIG. 8. In the power-saving processing unit 10 according to the fourth embodiment, a processing is started by turning on a power source or through another such operation. Then, the power-consumption information management section 101 manages management information such as the power-consumption information table 170. At the same time, the time prediction section 102 manages the interruption record table 220 (in a step S401).

Next, a request (or an instruction) to switch into a power-saving mode for the purpose of restraining a power consumption is issued. Then, the power-saving processing unit 10 executes the processing of a step S402 and the following steps. Sequentially, the step S401's processing is executed in parallel with the processing of the step S402 and the following steps.

In the step S402, the time prediction section 102 calculates a prediction time in all the power-saving modes except a current mode. Next, the mode-switching decision section 103 acquires management information such as the power-consumption information table 170 from the power-consumption information management section 101. Then, it acquires a prediction time for each power-saving mode from the time prediction section 102 (in a step S403). Next, among the power-saving modes from which a choice can be made, the mode-switching decision section 103 compares continuation periods or entire power consumptions, and chooses the most suitable power-saving mode (in a step S404). Sequentially, the mode-switching decision section 103 decides whether or not the switching into the power-saving mode that it has chosen is effective (in a step S405). Next, based on the decision result, the mode-switching execution section 104 executes the switching into the power-saving mode (in a step S406).

Herein, at the step S404, the mode-switching decision section 103 chooses the most suitable power-saving mode of the power-saving modes. Thereafter, at the step S405, without decides whether or not the switching into that power-saving mode is effective, it may also notify the mode-switching execution section 104 of the power-saving mode it has chosen so that the power-saving mode is executed as it is. In other words, taking into account an overhead at the time when switching is executed into the power-saving mode, from among the power-saving modes from which a choice can be made, the mode-switching decision section 103 may also allow the mode-switching execution section 104 to execute the most suitable power-saving mode.

Other Embodiments (1) In each embodiment as described above, the time prediction section 102 includes both the timer-event prediction section 74 and the repetitive-interruption prediction section 73. However, only either of them can also be used.

(2) In the fourth embodiment, the time, as a candidate for a shift destination from a current operation mode, the mode-switching decision section 103 expects all the power-saving modes other than the current operation mode. Then, it chooses the most suitable shift destination from among them. In contrast, such a candidate for the shift destination can also be restricted to power-saving modes within a certain range. In that case, the mode-switching instruction section 75 can give an instruction for such a predetermined range. The predetermined range may also differ according to which the current operation mode is. Besides, in the fourth embodiment, all the power-saving modes except the current operation mode is designed to be the shift-destination candidate. This is equivalent to the fact that the predetermined range is set to that range. In addition, an ordinary mode is also included in the shift-destination candidate. This means there is no limitation on the shift destination. This case is also equal to setting such a predetermined range to all the operation modes other than the current mode.

(3) In each table illustrated in FIG. 3 and FIG. 4, each piece of information is recorded for each operation mode. In contrast, each piece of information may also be recorded for each apparatus element to which a power-saving processing is applied. For example, in the tables of FIG. 3 and FIG. 4, information on a power-saving mode in which a sleep is given to an internal memory and an external memory is recorded at the identification number "2". But information may also be recorded by dividing them into the case where a sleep is separately given to an internal memory and the case where a sleep is individually given to an external memory.

In terms of switching into a power-saving mode in which a sleep is simultaneously given to an internal memory and an external memory, as a shift processing into the power-saving mode, the mode-switching decision section 103 adds power consumptions which are required for the processing that should be executed on those two apparatus elements. Thereby, the power consumption which is spent for the shift processing can be acquired. Besides, as the consumed power 173 of FIG. 4, instead of a consumed power when the system operates in each operation mode, a consumed power when a power-saving processing is applied to each apparatus element may also be recorded. Thereby, the mode-switching decision section 103 adds a consumed power in the case where a sleep is given to an internal memory and a consumed power in the case where a sleep is given to an external memory. As a result, it can acquire a consumed power when the operation mode is a power-saving mode in which a sleep is given to both an internal memory and an external memory. So far, an example has been described in which a sleep is given to an internal memory and an external memory, but similarly, in terms of a power-saving processing, a combination of them and another apparatus element can also be implemented.

Summary of the Embodiments

The summary of the embodiments of the present invention are described below.

(1) A certain power-saving processing unit is a power-saving processing unit which switches an operation mode of an object apparatus between a plurality of modes that includes an ordinary mode and one or more power-saving modes. The unit comprises: a power-consumption information management section which manages information on a processing for switching the operation mode; a time prediction section which, when a request is made to switch from a current mode to another mode among the plurality of modes, then predicts a period of time until such another mode is removed if the switching request is accepted or a period of time until a return is given to the current mode if the switching request is accepted; a mode-switching decision section which calculates a period of time when such another mode continues based on management information which is the information that is managed by the power-consumption information management section and prediction time which is the period of time that is predicted by the time prediction section, and using the calculated value, decides whether or not the operation mode should be switched from the current mode to such another mode; and a mode-switching execution section which switches the operation mode of the object apparatus according to a decision by the mode-switching decision section.

The management information includes information for deriving a period of time when each of the other modes continues based upon the prediction time for each mode, from among a processing time which is taken for a shift processing from the current mode to each of the other modes and a processing time which is taken for a return processing from each of the other modes to the current mode.

According to this configuration, if a request is made to switch from a current mode to another mode, then based upon management information and prediction time, a decision is made whether or not switching should be executed into another mode which the request is made for. In the decision, a period of time is used when a shift-destination mode continues which is led from the management information and the prediction time. For example, if the period of time when a shift-destination mode continues does not meet any reference, the decision is made that the operation mode will not be switched. Thereby, if disadvantage of a power consumption in a shift processing or a return processing is not negligible, the switching can be withheld. Hence, according to this configuration, appropriate mode switching can be realized, taking into account a power consumption as well which is produced in a shift processing and a return processing for switching an operation mode.

Herein, "to manage information" means to maintain the corresponding information so that it can be used according to its purpose, such as to secure, hold, or change if necessary, the corresponding information.

(2) A certain power-saving processing unit is the power-saving processing unit (1), wherein the one or more power-saving modes are two or more power-saving modes.

According to this configuration, the one or more power-saving modes are two or more power-saving modes. Therefore, the operation mode can be switched between an ordinary mode and two or more power-saving modes.

(3) A certain power-saving processing unit is a power-saving processing unit which switches an operation mode of an object apparatus between a plurality of modes that includes an ordinary mode and two or more power-saving modes. The unit comprises: a power-consumption information management section which manages information on a processing for switching the operation mode; a time prediction section which, when a request is made to switch from a current mode to modes within a specific range that includes two or more other modes among the plurality of modes, then predicts a period of time until each mode within the specific range is removed if the switching request is accepted or a period of time until a return is given from each mode within the specific range to the current mode if the switching request is accepted; a mode-switching decision section which calculates a period of time when each mode within the specific range continues based on management information which is the information that is managed by the power-consumption information management section and prediction time which is the period of time for each mode that is predicted by the time prediction section, and using the calculated value, decides a destination to which the current mode is switched among modes within the specific range; and a mode-switching execution section which switches the operation mode of the object apparatus according to a decision by the mode-switching decision section.

The management information includes information for deriving a period of time when each of the other modes continues based upon the prediction time for each mode, from among a processing time which is taken for a shift processing from the current mode to each of the other modes and a processing time which is taken for a return processing from each of the other modes to the current mode.

According to this configuration, for example, if a request is made to switch into modes within a specific range such as two or more power-saving modes, then based upon management information and prediction time, a decision is made to which mode within the specific range switching should be executed. In the decision, a period of time is used when each shift-destination mode continues which is led from the management information and the prediction time. For example, among the periods of time when the shift-destination modes continue, the longest one is decided as a switching destination. Thereby, the operation mode's shift destination is set so that a power consumption can be cut down at the maximum and a power consumption in a shift processing and a return processing brings the least adverse effects. Hence, according to this configuration, appropriate mode switching can be realized, taking into account a power consumption as well which is produced in a shift processing and a return processing for switching an operation mode.

Herein, the "specific range" can be various ranges other than a current mode, such as the range of all power-saving modes, the range of a part of them, and the range which includes an ordinary mode. Besides, the specific range also includes the range of all modes except a current mode, in other words, an unspecified range.

(4) A certain power-saving processing unit is a power-saving processing unit which switches an operation mode of an object apparatus between a plurality of modes that includes an ordinary mode and two or more power-saving modes. The unit comprises: a power-consumption information management section which manages information on a processing for switching the operation mode; a time prediction section which, when a request is made to switch from a current mode to modes within a specific range that includes two or more other modes among the plurality of modes, then predicts a period of time until each mode within the specific range is removed if the switching request is accepted or a period of time until a return is given from each mode within the specific range to the current mode if the switching request is accepted; a mode-switching decision section which calculates a period of time when each mode within the specific range continues based on management information which is the information that is managed by the power-consumption information management section and prediction time which is the period of time for each mode that is predicted by the time prediction section, and using the calculated value, decides to which mode within the specific range the operation mode should be switched from the current mode, or it should not be switched to any mode; and a mode-switching execution section which switches the operation mode of the object apparatus according to a decision by the mode-switching decision section.

The management information includes information for deriving a period of time when each of the other modes continues based upon the prediction time for each mode, from among a processing time which is taken for a shift processing from the current mode to each of the other modes and a processing time which is taken for a return processing from each of the other modes to the current mode.

According to this configuration, for example, if a request is made to switch into modes within a specific range such as two or more power-saving modes, then based upon management information and prediction time, a decision is made to which mode within the specific rang switching should be executed, or whether switching should not be executed to any mode. In the decision, a period of time is used when each shift-destination mode continues which is led from the management information and the prediction time. For example, among the periods of time when the shift-destination modes continue, the longest one is decided as a shift-destination candidate. Besides, for example, if the period of time when a shift-destination mode as the candidate continues does not meet any reference, the decision is made that the operation mode will not be switched. Thereby, the operation mode's shift destination is set so that a power consumption can be cut down at the maximum and a power consumption in a shift processing and a return processing brings the least adverse effects. In addition, even in any shift-destination mode, if a disadvantage which is caused by operation-mode switching cannot be neglected, the switching can be withheld. Hence, according to this configuration, appropriate mode switching can be realized, taking into account a power consumption as well which is produced in a shift processing and a return processing for switching an operation mode. Herein, the specific range is the same as described already.

(5) A certain power-saving processing unit is any one of the power-saving processing units (1) to (4), wherein the switching request includes a switching request when the current mode is the ordinary mode.

According to this configuration, the switching request includes a switching request when the current mode is the ordinary mode. Therefore, when a switching request is made from an ordinary mode, suitable mode switching can be realized, taking into account a power consumption as well which is produced in a shift processing and a return processing for switching an operation mode.

(6) A certain power-saving processing unit is any one of the power-saving processing units (2) to (4), wherein the switching request includes: a switching request when the current mode is the ordinary mode; and a switching request when the current mode is one of the two or more power-saving modes.

According to this configuration, the switching request includes a switching request when the current mode is the ordinary mode and a switching request when it is one of power-saving modes. Therefore, when a switching request is made from the ordinary mode, and when a switching request is made from a certain power-saving mode, proper mode switching can be realized, considering a power consumption as well which is produced in a shift processing and a return processing for switching an operation mode.

(7) A certain power-saving processing unit is any one of the power-saving processing units (1) to (6), wherein the mode-switching decision section makes the decision by estimating the length of a period of time when such another mode continues.

According to this configuration, in terms of a mode as a shift destination or a mode as a candidate for a shift destination, the mode-switching decision section makes the decision by estimating the length of a period of time when such another mode continues. For example, the mode-switching decision section decides that the operation mode should be switched only if this period length is a positive number, or chooses an operation mode which has the greatest period length as the shift destination. This makes it possible to obtain a decision result using a simple processing.

(8) A certain power-saving processing unit is any one of the power-saving processing units (1) to (6), wherein: the mode-switching decision section makes the decision by estimating a power consumption as the sum of a power consumption which is spent in the shift processing to such another mode, a power consumption which is spent during a period of time when such another mode continues and a power consumption which is spent in the return processing to the current mode.

The management information includes information for deriving a power consumption to be estimated by the mode-switching decision section based on the prediction time for each mode, from among consumed power of the object apparatus in each of the other modes, a power consumption of the object apparatus which is spent in the shift processing from the current mode to each of the other modes, consumed power of the object apparatus which is spent in the shift processing from the current mode to each of the other modes, a processing time which is taken in the shift processing from the current mode to each of the other modes, a power consumption of the object apparatus which is spent in the return processing from each of the other modes to the current mode, consumed power of the object apparatus which is spent in the return processing from each of the other modes to the current mode and a processing time which is taken in the return processing from each of the other modes to the current mode.

According to this configuration, a power consumption by the operation-mode switching is estimated, considering a power consumption as well which is produced in a shift processing and a return processing, so that a decision is made. For example, the decision is made that an operation mode which has the least power consumption is chosen as the shift destination. Or, the decision is made that a change in the mode is made only if the power consumption is less than a power consumption in the current mode. Thereby, taking directly into account a power consumption which is produced in a shift processing and a return processing, a more precise decision can be made. Consequently, mode switching can be realized more properly.

A power consumption which is spent during a period of time when another mode continues has to be calculated by multiplying the consumed power of the object apparatus in another mode which is included in the management information by the period of time when another mode continues. In other words, according to this configuration, the mode-switching decision section calculates the period of time when another mode continues. Then, the calculated value is used to calculate the power consumption during the period. Herein, in terms of the relation between the consumed power and the power consumption, a power consumption per unit time is equivalent to consumed power. In other words, the power consumption is equal to a time integral quantity of the consumed power.

(9) A certain power-saving processing unit is the power-saving processing unit (1) or (2), wherein: the mode-switching decision section makes the decision by comparing a power consumption as the sum of a power consumption which is spent in the shift processing to such another mode, a power consumption which is spent during a period of time when such another mode continues and a power consumption which is spent in the return processing to the current mode, with a power consumption in the current mode during the same period of time; and the management information includes information for deriving power consumptions to be compared by the mode-switching decision section based on the prediction time for each mode, from among consumed power of the object apparatus in the current mode, consumed power of the object apparatus in each of the other modes, a power consumption of the object apparatus which is spent in the shift processing from the current mode to each of the other modes, consumed power of the object apparatus which is spent in the shift processing from the current mode to each of the other modes, a processing time which is taken in the shift processing from the current mode to each of the other modes, a power consumption of the object apparatus which is spent in the return processing from each of the other modes to the current mode, consumed power of the object apparatus which is spent in the return processing from each of the other modes to the current mode and a processing time which is taken in the return processing from each of the other modes to the current mode.

According to this configuration, a power consumption by the operation-mode switching is compared with a power consumption in the case where operation-mode switching is not executed, taking into account a power consumption as well which is produced in a shift processing and a return processing. Based upon this comparison, a decision is made. Thereby, taking directly into account a power consumption which is produced in a shift processing and a return processing, a more precise decision can be made. As a result, more appropriate mode switching can be realized.

In the same way as the configuration according to the eighth aspect, according to this configuration, the mode-switching decision section calculates the period of time when another mode continues. Then, the calculated value is used to calculate the power consumption during the period. Herein, the relation between the consumed power and the power consumption is the same as described already.

(10) A certain power-saving processing unit is any one of the power-saving processing units (1) to (9), further comprising: a timer-event management section which manages a timer event, wherein the time prediction section includes a timer-event prediction section which searches a timer event that is managed by the timer-event management section, and based on a time when the timer event is executed, predicts a period of time until a shift-destination mode is removed which should be predicted by the time prediction section.

According to this configuration, the timer-event prediction section is provided. Therefore, a prediction time which is a base of the mode-switching decision section's decision reflects the time when a timer event is executed. This helps realize a more accurate decision easily.

(11) A certain power-saving processing unit is the power-saving processing unit (10), wherein: the timer-event management section also manages, in every timer event, apparatus usage information which indicates whether or not a component part of the object apparatus should be used as a timer event is executed; the management information which is managed by the power-consumption information management section includes apparatus choice information which indicates which of the component parts of the object apparatus should be used or not be used in each power-saving mode; and the timer-event prediction section refers to the apparatus usage information and the apparatus choice information, and predicts a period of time until the shift-destination mode is removed, based on an execution time for a timer event in which a component part of the object apparatus that is not used in the shift-destination mode which should be predicted is first used among the timer events which are managed by the timer-event management section.

According to this configuration, the timer-event prediction section refers to the apparatus usage information and the apparatus choice information, and predicts a period of time until the shift-destination mode is removed, based on an execution time for a timer event in which a component part of the object apparatus that is not used in a shift-destination mode which should be predicted is first used, among the timer events which are managed by the timer-event management section. Therefore, a prediction time can be obtained more precisely, taking into account each timer event and the state where the apparatus is used or unused in the shift-destination mode as well.

(12) A certain power-saving processing unit is any one of the power-saving processing units (1) to (11), wherein the time prediction section includes a repetitive-interruption prediction section which predicts a period of time until a shift-destination mode is removed or a period of time until a return is given to the current mode which should be predicted by the time prediction section, based on each time interval of one or more kinds of repetitive interruptions which were issued in the past.

According to this configuration, the repetitive-interruption prediction section is provided. Therefore, based on the past performance, a prediction time which is a base of the mode-switching decision section's decision reflects the time when a repetitive interruption is produced. This helps realize a more accurate decision. Herein, the time prediction section can include both the timer-event prediction section and the repetitive-interruption prediction section. Thereby, a prediction time can be obtained, considering both a timer event and a repetitive interruption.

(13) A certain power-saving processing unit is the power-saving processing unit (12), wherein the repetitive-interruption prediction section: includes a measurement section which calculates each average value of time intervals of each of the one or more kinds of repetitive interruptions which were issued in the past; and predicts a period of time until a shift-destination mode is removed or a period of time until a return is given to the current mode which should be predicted, based on the each average value.

According to this configuration, a prediction time is obtained based on the average value of the time intervals of repetitive interruptions which were issued in the past. This makes it possible to obtain a prediction time at high accuracy.

(14) A certain power-saving processing unit is the power-saving processing unit (12), wherein the repetitive-interruption prediction section: includes a measurement section which calculates each latest time interval of the one or more kinds of repetitive interruptions which were issued in the past; and predicts a period of time until a shift-destination mode is removed or a period of time until a return is given to the current mode which should be predicted, based on each latest time interval.

According to this configuration, a prediction time is obtained based on the latest time interval of each repetitive interruption which was issued in the past. This makes it possible to obtain a prediction time, using a simple calculation.

(15) A certain power-saving processing unit is any one of the power-saving processing units (12) to (14), wherein: the time prediction section manages apparatus usage information which indicates whether or not a component part of the object apparatus should be used as each of the one or more kinds of repetitive interruptions which were issued in the past is executed; the management information which is managed by the power-consumption information management section includes apparatus choice information which indicates which of the component parts of the object apparatus should be used or not be used in each power-saving mode; and the repetitive-interruption prediction section refers to the apparatus usage information and the apparatus choice information, and predicts a period of time until the shift-destination mode is removed or a period of time until a return is given to the current mode, based on a time interval of a repetitive interruption in which a component part of the object apparatus that is not used in the shift-destination mode which should be predicted is used, among the one or more kinds of repetitive interruptions which were issued in the past.

According to this configuration, the repetitive-interruption prediction section refers to the apparatus usage information and the apparatus choice information, and thereby obtains a prediction time based on a time interval of a repetitive interruption in which a component part of the object apparatus that is not used in a shift-destination mode which should be predicted is used, among the repetitive interruptions which were issued in the past. Therefore, a prediction time can be obtained more precisely, taking into account each repetitive interruption and the state where the apparatus is used or unused in the shift-destination mode as well.

(16) A certain power-saving processing unit is any one of the power-saving processing units (1) to (15), wherein the power-saving processing unit is included in the object apparatus, and the power-saving processing unit itself is also an object for operation-mode switching.

According to this configuration, the power-saving processing unit itself as a part of the object apparatus is also an object for operation-mode switching. This helps realize a more effective power-saving processing.

(17) A certain power-saving processing unit is any one of the power-saving processing units (1) to (16), wherein the power-saving processing unit is formed as a semiconductor integrated circuit which is embedded in a single semiconductor substrate.

According to this configuration, the power-saving processing unit according to the present invention is formed in a single semiconductor substrate. Therefore, the power-saving processing unit according to the present invention can be used in a compact state. Hence, this configuration is suitably used for a portable communication terminal such as a cellular phone.

(18) A certain power-saving processing method is a power-saving processing method in which an operation mode of an object apparatus is switched between a plurality of modes that includes an ordinary mode and one or more power-saving modes. The method comprises: a power-consumption information managing step of managing information on the processing for switching the operation mode; a time predicting step of, when a request is made to switch from a current mode to another mode among the plurality of modes, then predicting a period of time until such another mode is removed if the switching request is accepted or a period of time until a return is given to the current mode if the switching request is accepted; a mode-switching deciding step of deciding whether or not the operation mode should be switched from the current mode to such another mode, based on management information which is the information that is managed in the power-consumption information managing step and prediction time which is the period of time that is predicted in the time predicting step; and a power-saving mode executing step of switching the operation mode of the object apparatus according to a decision in the mode-switching deciding step.

The management information includes information for deriving a period of time when each of the other modes continues based upon the prediction time for each mode, from among a processing time which is taken for a shift processing from the current mode to each of the other modes and a processing time which is taken for a return processing from each of the other modes to the current mode.

According to this configuration, for the same reason as described concerning the power-saving processing unit (1), appropriate mode switching can be realized, taking into account a power consumption as well which is produced in a shift processing and a return processing for switching an operation mode.

(19) A certain power-saving processing unit is a program record medium storing a power-saving processing program which allows a computer to function as a power-saving processing unit which switches an operation mode of an object apparatus between a plurality of modes that includes an ordinary mode and one or more power-saving modes. The program allows a computer to function as: a power-consumption information managing means for managing information on the processing for switching the operation mode; a time predicting means for, when a request is made to switch from a current mode to another mode among the plurality of modes, then predicting a period of time until such another mode is removed if the switching request is accepted or a period of time until a return is given to the current mode if the switching request is accepted; a mode-switching deciding means for, based on management information which is the information that is managed by the power-consumption information managing means and prediction time which is the period of time that is predicted by the time predicting means, deciding whether or not the operation mode should be switched from the current mode to such another mode; and a power-saving mode executing means for switching the operation mode of the object apparatus according to a decision by the mode-switching deciding means, The management information includes information for deriving a period of time when each of the other modes continues based upon the prediction time for each mode, from among a processing time which is taken for a shift processing from the current mode to each of the other modes and a processing time which is taken for a return processing from each of the other modes to the current mode.

According to this configuration, for the same reason as described concerning the power-saving processing unit (1), appropriate mode switching can be realized, taking into account a power consumption as well which is produced in a shift processing and a return processing for switching an operation mode.

In terms of the power-saving processing unit, the power-saving processing method and a program record medium according to the present invention, in a system which executes a power-saving mode or an object apparatus, a power-saving processing is executed, considering an overhead when switching is executed into the power-saving mode. Thereby, they have the function of restraining a power consumption and are useful for equipment which consumes power, such as information equipment, AV equipment, communication equipment and a household appliance.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power-saving processing unit which switches an operation mode of an object apparatus between a plurality of modes that includes an ordinary mode and one or more power-saving modes, comprising:
   a power-consumption information management section which manages information on a processing for switching the operation mode;
   a time prediction section which, when a request is made to switch from a current mode to another mode among the plurality of modes, then predicts a period of time until such another mode is removed if the switching request is accepted or a period of time until a return is given to the current mode if the switching request is accepted;
   a mode-switching decision section which calculates a period of time when such another mode continues based on management information which is the information that is managed by the power-consumption information management section and prediction time which is the period of time that is predicted by the time prediction section, and using the calculated value, decides whether or not the operation mode should be switched from the current mode to such another mode; and
   a mode-switching execution section which switches the operation mode of the object apparatus according to a decision by the mode-switching decision section,
   wherein the management information includes information for deriving a period of time when each of the other modes continues based upon the prediction time for each mode, from among a processing time which is taken for a shift processing from the current mode to each of the other modes and a processing time which is taken for a return processing from each of the other modes to the current mode.

2. The power-saving processing unit according to claim 1, wherein the one or more power-saving modes are two or more power-saving modes.

3. The power-saving processing unit according to claim 2, wherein the switching request includes: a switching request when the current mode is the ordinary mode; and a switching request when the current mode is one of the two or more power-saving modes.

4. The power-saving processing unit according to claim 1, wherein the switching request includes a switching request when the current mode is the ordinary mode.

5. The power-saving processing unit according to claim 1, wherein the mode-switching decision section makes the decision by estimating the length of a period of time when such another mode continues.

6. The power-saving processing unit according to claim 1, wherein:
   the mode-switching decision section makes the decision by estimating a power consumption as the sum of a power consumption which is spent in the shift processing to such another mode, a power consumption which is spent during a period of time when such another mode continues and a power consumption which is spent in the return processing to the current mode; and
   the management information includes information for deriving a power consumption to be estimated by the mode-switching decision section based on the prediction time for each mode, from among consumed power of the object apparatus in each of the other modes, a power consumption of the object apparatus which is spent in the shift processing from the current mode to each of the other modes, consumed power of the object apparatus which is spent in the shift processing from the current mode to each of the other modes, a processing time which is taken in the shift processing from the current mode to each of the other modes, a power consumption of the object apparatus which is spent in the return processing from each of the other modes to the current mode, consumed power of the object apparatus which is spent in the return processing from each of the other modes to the current mode and a processing time which is taken in the return processing from each of the other modes to the current mode.

7. The power-saving processing unit according to claim 1, wherein:
   the mode-switching decision section makes the decision by comparing a power consumption as the sum of a power consumption which is spent in the shift processing to such another mode, a power consumption which is spent during a period of time when such another mode continues and a power consumption which is spent in the return processing to the current mode, with a power consumption in the current mode during the same period of time; and
   the management information includes information for deriving power consumptions to be compared by the mode-switching decision section based on the prediction time for each mode, from among consumed power of the object apparatus in the current mode, consumed power of the object apparatus in each of the other modes, a power consumption of the object apparatus which is spent in the shift processing from the current mode to each of the other modes, consumed power of the object apparatus which is spent in the shift processing from the current mode to each of the other modes, a processing time which is taken in the shift processing from the current mode to each of the other modes, a power consumption of the object apparatus which is spent in the return processing from each of the other modes to the current mode, consumed power of the object apparatus which is spent in the return processing from each of the other modes to the current mode and a processing time which is taken in the return processing from each of the other modes to the current mode.

8. The power-saving processing unit according to claim 1, further comprising:
a timer-event management section which manages a timer event, wherein
the time prediction section includes a timer-event prediction section which searches a timer event that is managed by the timer-event management section, and based on a time when the timer event is executed, predicts a period of time until a shift-destination mode is removed which should be predicted by the time prediction section.

9. The power-saving processing unit according to claim 8, wherein:
the timer-event management section also manages, in every timer event, apparatus usage information which indicates whether or not a component part of the object apparatus should be used as a timer event is executed;
the management information which is managed by the power-consumption information management section includes apparatus choice information which indicates which of the component parts of the object apparatus should be used or not be used in each power-saving mode; and
the timer-event prediction section refers to the apparatus usage information and the apparatus choice information, and predicts a period of time until the shift-destination mode is removed, based on an execution time for a timer event in which a component part of the object apparatus that is not used in the shift-destination mode which should be predicted is first used among the timer events which are managed by the timer-event management section.

10. The power-saving processing unit according to claim 1, wherein the time prediction section includes a repetitive-interruption prediction section which predicts a period of time until a shift-destination mode is removed or a period of time until a return is given to the current mode which should be predicted by the time prediction section, based on each time interval of one or more kinds of repetitive interruptions which were issued in the past.

11. The power-saving processing unit according to claim 10, wherein the repetitive-interruption prediction section: includes a measurement section which calculates each average value of time intervals of each of the one or more kinds of repetitive interruptions which were issued in the past; and predicts a period of time until a shift-destination mode is removed or a period of time until a return is given to the current mode which should be predicted, based on the each average value.

12. The power-saving processing unit according to claim 10, wherein the repetitive-interruption prediction section: includes a measurement section which calculates each latest time interval of the one or more kinds of repetitive interruptions which were issued in the past; and predicts a period of time until a shift-destination mode is removed or a period of time until a return is given to the current mode which should be predicted, based on each latest time interval.

13. The power-saving processing unit according, to claim 10, wherein:
the time prediction section manages apparatus usage information which indicates whether or not a component part of the object apparatus should be used as each of the one or more kinds of repetitive interruptions which were issued in the past is executed;
the management information which is managed by the power-consumption information management section includes apparatus choice information which indicates which of the component parts of the object apparatus should be used or not be used in each power-saving mode; and
the repetitive-interruption prediction section refers to the apparatus usage information and the apparatus choice information, and predicts a period of time until the shift-destination mode is removed or a period of time until a return is given to the current mode, based on a time interval of a repetitive interruption in which a component part of the object apparatus that is not used in the shift-destination mode which should be predicted is used, among the one or more kinds of repetitive interruptions which were issued in the past.

14. The power-saving processing unit according to claim 1, wherein the power-saving processing unit is included in the object apparatus, and the power-saving processing unit itself is also an object for operation-mode switching.

15. The power-saving processing unit according to claim 1, wherein the power-saving processing unit is formed as a semiconductor integrated circuit which is embedded in a single semiconductor substrate.

16. A power-saving processing unit which switches an operation mode of an object apparatus between a plurality of modes that includes an ordinary mode and two or more power-saving modes, comprising:
a power-consumption information management section which manages information on a processing for switching the operation mode;
a time prediction section which, when a request is made to switch from a current mode to modes within a specific range that includes two or more other modes among the plurality of modes, then predicts a period of time until each mode within the specific range is removed if the switching request is accepted or a period of time until a return is given from each mode within the specific range to the current mode if the switching request is accepted;
a mode-switching decision section which calculates a period of time when each mode within the specific range continues based on management information which is the information that is managed by the power-consumption information management section and prediction time which is the period of time for each mode that is predicted by the time prediction section, and using the calculated value, decides a destination to which the current mode is switched among modes within the specific range; and
a mode-switching execution section which switches the operation mode of the object apparatus according to a decision by the mode-switching decision section, wherein the management information includes information for deriving a period of time when each of the other modes continues based upon the prediction time for each mode, from among a processing time which is taken for a shift processing from the current mode to each of the other modes and a processing time which is taken for a return processing from each of the other modes to the current mode.

17. A power-saving processing unit which switches an operation mode of an object apparatus between a plurality of modes that includes an ordinary mode and two or more power-saving modes, comprising:

a power-consumption information management section which manages information on a processing for switching the operation mode;

a time prediction section which, when a request is made to switch from a current mode to modes within a specific range that includes two or more other modes among the plurality of modes, then predicts a period of time until each mode within the specific range is removed if the switching request is accepted or a period of time until a return is given from each mode within the specific range to the current mode if the switching request is accepted;

a mode-switching decision section which calculates a period of time when each mode within the specific range continues based on management information which is the information that is managed by the power-consumption information management section and prediction time which is the period of time for each mode that is predicted by the time prediction section, and using the calculated value, decides to which mode within the specific range the operation mode should be switched from the current mode, or it should not be switched to any mode; and a mode-switching execution section which switches the operation mode of the object apparatus according to a decision by the mode-switching decision section, wherein the management information includes information for deriving a period of time when each of the other modes continues based upon the prediction time for each mode, from among a processing time which is taken for a shift processing from the current mode to each of the other modes and a processing time which is taken for a return processing from each of the other modes to the current mode.

18. A power-saving processing method in which an operation mode of an object apparatus is switched between a plurality of modes that includes an ordinary mode and one or more power-saving modes, comprising:

a power-consumption information managing step of managing information on the processing for switching the operation mode;

a time predicting step of, when a request is made to switch from a current mode to another mode among the plurality of modes, then predicting a period of time until such another mode is removed if the switching request is accepted or a period of time until a return is given to the current mode if the switching request is accepted;

a mode-switching deciding step of deciding whether or not the operation mode should be switched from the current mode to such another mode, based on management information which is the information that is managed in the power-consumption information managing step and prediction time which is the period of time that is predicted in the time predicting step; and a power-saving mode executing step of switching the operation mode of the object apparatus according to a decision in the mode-switching deciding step, wherein the management information includes information for deriving a period of time when each of the other modes continues based upon the prediction time for each mode, from among a processing time which is taken for a shift processing from the current mode to each of the other modes and a processing time which is taken for a return processing from each of the other modes to the current mode.

19. A program record medium storing a power-saving processing program which allows a computer to function as a power-saving processing unit which switches an operation mode of an object apparatus between a plurality of modes that includes an ordinary mode and one or more power-saving modes, the program allowing a computer to function as:

a power-consumption information managing means for managing information on the processing for switching the operation mode;

a time predicting means for, when a request is made to switch from a current mode to another mode among the plurality of modes, then predicting a period of time until such another mode is removed if the switching request is accepted or a period of time until a return is given to the current mode if the switching request is accepted;

a mode-switching deciding means for, based on management information which is the information that is managed by the power-consumption information managing means and prediction time which is the period of time that is predicted by the time predicting means, deciding whether or not the operation mode should be switched from the current mode to such another mode; and a power-saving mode executing means for switching the operation mode of the object apparatus according to a decision by the mode-switching deciding means, wherein the management information includes information for deriving a period of time when each of the other modes continues based upon the prediction time for each mode, from among a processing time which is taken for a shift processing from the current mode to each of the other modes and a processing time which is taken for a return processing from each of the other modes to the current mode.

* * * * *